US012581147B2

(12) United States Patent
Levin et al.

(10) Patent No.: US 12,581,147 B2
(45) Date of Patent: Mar. 17, 2026

(54) SYSTEMS AND METHODS FOR CONTROLLING QUALITY OF CONTENT

(71) Applicant: NBCUniversal Media, LLC, New York, NY (US)

(72) Inventors: Michael S. Levin, Jersey City, NJ (US); Christopher Lynn, Brooklyn, NY (US); Alexandra Paige, New York, NY (US); Carlos Costa, Centennial, CO (US); Craig Gardner, Littleton, CO (US); Megan Mauck, Santa Monica, CA (US); Dominic Insogna, Staten Island, NY (US); Vanessa Cavorti, East Islip, NY (US); Beth Kramer, Woodside, NY (US); Karthik Rengasamy, Seacaucus, NJ (US); Rebecca Mason, Merrick, NY (US)

(73) Assignee: NBCUniversal Media, LLC, New York, NY (US)

( * ) Notice: Subject to any disclaimer, the term of this patent is extended or adjusted under 35 U.S.C. 154(b) by 0 days.

(21) Appl. No.: 17/986,601

(22) Filed: Nov. 14, 2022

(65) Prior Publication Data

US 2023/0188774 A1      Jun. 15, 2023

Related U.S. Application Data

(63) Continuation of application No. 16/951,752, filed on Nov. 18, 2020, now Pat. No. 11,509,950.

(Continued)

(51) Int. Cl.
*H04N 21/266* (2011.01)
*G06F 16/78* (2019.01)

(Continued)

(52) U.S. Cl.
CPC ....... *H04N 21/266* (2013.01); *G06F 16/7867* (2019.01); *G06F 16/9566* (2019.01); *H04N 21/812* (2013.01)

(58) Field of Classification Search
CPC ............. H04N 21/266; H04N 21/9566; H04N 21/812; G06F 16/7867
See application file for complete search history.

(56) References Cited

U.S. PATENT DOCUMENTS

| | | | |
|---|---|---|---|
| 8,214,518 B1 | 7/2012 | Bertz | |
| 8,516,590 B1 * | 8/2013 | Ranadive | ............ H04L 63/1483 |
| | | | 713/188 |

(Continued)

OTHER PUBLICATIONS

European Search Report; EP Application No. EP 20217294.6; dated Jul. 6, 2021.

*Primary Examiner* — Chenea Davis
(74) *Attorney, Agent, or Firm* — Fletcher Yoder, P.C.

(57) ABSTRACT

Systems and methods for controlling quality of content is provided. A confidence tool of an automated quality control system may receive a request to analyze a tag indicating content to be presented by a content presentation service. The tag may be indicative of a link to the content and a tracking pixel associated with the content. The confidence tool may determine whether the tag meets criteria (e.g., pixel whitelisting criteria, specification of a content presentation service). The confidence tool may notify a user whether the tag meets the criteria to prevent problematic content from being presented by the content presentation service.

20 Claims, 24 Drawing Sheets

Related U.S. Application Data

(60) Provisional application No. 63/004,845, filed on Apr. 3, 2020.

(51) Int. Cl.
  *G06F 16/955* (2019.01)
  *H04N 21/81* (2011.01)

(56) References Cited

U.S. PATENT DOCUMENTS

| | | | | | |
|---|---|---|---|---|---|
| 9,009,834 | B1 * | 4/2015 | Ren | .......................... | G06F 21/56 |
| | | | | | 709/224 |
| 9,135,345 | B1 | 9/2015 | Larsson | | |
| 9,553,918 | B1 | 1/2017 | Manion | | |
| 9,712,800 | B2 * | 7/2017 | St. Clair | .............. | H04N 9/8211 |
| 10,672,039 | B2 * | 6/2020 | Subramanian | ..... | G06Q 30/0277 |
| 2010/0306152 | A1 * | 12/2010 | Altay | ..................... | G11B 27/36 |
| | | | | | 706/47 |
| 2013/0212638 | A1 * | 8/2013 | Wilson | .................. | G06F 21/645 |
| | | | | | 726/1 |
| 2015/0128157 | A1 * | 5/2015 | Hardie | ............... | H04N 21/4126 |
| | | | | | 725/5 |
| 2017/0070476 | A1 | 3/2017 | Massoudi | | |
| 2017/0120151 | A1 * | 5/2017 | Relan | ....................... | A63F 13/61 |
| 2017/0366498 | A1 * | 12/2017 | Green | ..................... | G06F 16/40 |
| 2017/0374361 | A1 * | 12/2017 | Carmel | ................ | H04N 19/154 |
| 2019/0188753 | A1 | 6/2019 | McConnell | | |
| 2021/0266353 | A1 * | 8/2021 | Grubb | ................ | H04N 21/4384 |

* cited by examiner

SEARCH AND FILTER BY...  [ADD]

ACTIONS...▽

| CAMPAIGN ID | CREATIVE NAME | VENDOR | ADVERTISER | VERTICAL | CREATED DATE | CREATED BY | START DATE | QC RESULT | CLEARED FOR | PROGRESS |
|---|---|---|---|---|---|---|---|---|---|---|
| 5078034 | CREATIVE #1 | VENDOR #1 | COMPANY #1 | ENTERTAINMENT | 5/10/19 | USER #1 | 5/10/19 | | | 50% PACKAGE QC REQUIRED |
| 3251197 | CREATIVE #2 | VENDOR #2 | AD SOLUTION TEST | FWS | 5/10/19 | USER #2 | 5/2/19 | FAIL | AD PRESENTATION SERVICE | 70% TEST QC SALES OPS REVIEW |
| 3251197 | CREATIVE #3 | VENDOR #3 | AD SOLUTION TEST | FWS | 5/10/19 | USER #3 | 1/1/19 | PASS | AD PRESENTATION SERVICE & ON DOMAIN | 100% TEST DELIVERED |
| 3251197 | CREATIVE #4 | VENDOR #4 | AD SOLUTION TEST | FWS | 5/10/19 | USER #4 | 1/1/19 | FAIL | NONE | 70% TEST QC SALES OPS REVIEW |
| 5077673 | CREATIVE #5 | VENDOR #5 | COMPANY #2 | ENTERTAINMENT | 5/10/19 | USER #5 | 5/10/19 | PASS | AD PRESENTATION SERVICE & ON DOMAIN | 100% TEST DELIVERED |
| | CREATIVE #6 | VENDOR #6 | TEST ADVERTISER | FWS | 5/10/19 | USER #6 | 5/10/19 | FAIL | AD PRESENTATION SERVICE | 70% TEST QC SALES OPS REVIEW |
| 5069983 | CREATIVE #7 | VENDOR #7 | COMPANY #3 | ENTERTAINMENT | 5/9/19 | USER #7 | 5/13/19 | PASS | AD PRESENTATION SERVICE & ON DOMAIN | 100% TEST DELIVERED |

CREATE QC WORK ORDER

CAMPAIGN ORDER ID [OPTIONAL] —164
987654321

CAMPAIGN NAME* —186
NEW PRODUCT

VERTICAL* —168
ENTERTAINMENT

ADVERTISER* —169
COMPANY 1, INC

ADVERTISER ID* —188
12345

INDUSTRY —190
PACKAGED GOODS

SAVE —192

QC WORK
ORDERS

ABOUT
LOG OUT

Figure 8:
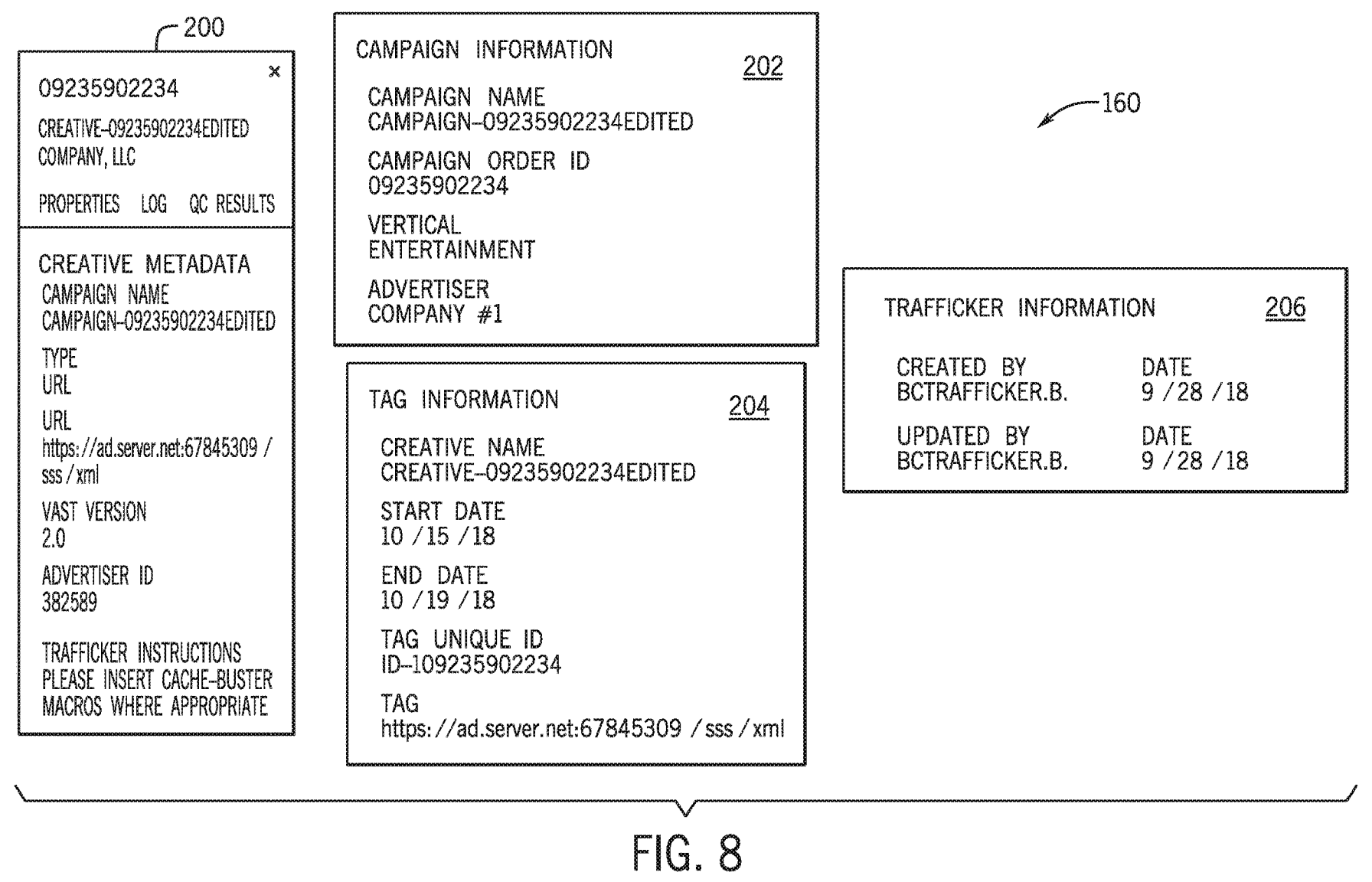

CAMPAIGN INFORMATION  202

CAMPAIGN NAME
CAMPAIGN-09235902234EDITED

CAMPAIGN ORDER ID
09235902234

VERTICAL
ENTERTAINMENT

ADVERTISER
COMPANY #1

TRAFFICKER INFORMATION  206

CREATED BY          DATE
BCTRAFFICKER.B.      9/28/18

UPDATED BY          DATE
BCTRAFFICKER.B.      9/28/18

TAG INFORMATION  204

CREATIVE NAME
CREATIVE-09235902234EDITED

START DATE
10/15/18

END DATE
10/19/18

TAG UNIQUE ID
ID-109235902234

TAG
https://ad.server.net:67845309/sss/xml

200                    ✕

09235902234

CREATIVE-09235902234EDITED
COMPANY, LLC

PROPERTIES  LOG  QC RESULTS

CREATIVE METADATA
CAMPAIGN NAME
CAMPAIGN-09235902234EDITED

TYPE
URL

URL
https://ad.server.net:67845309/
sss/xml

VAST VERSION
2.0

ADVERTISER ID
382589

TRAFFICKER INSTRUCTIONS
PLEASE INSERT CACHE-BUSTER
MACROS WHERE APPROPRIATE

| | | | VENDOR | ADVERTISER |
|---|---|---|---|---|
| | | | | TEST ADVERTISER |
| ☐ | 5073234 | VAST TAG #2 | VENDOR #1 | ADVERTISER #1 |
| ☐ | 5073724 | VAST TAG #3 | VENDOR #2 | ADVERTISER #2 |
| ☐ | 5073336 | VAST TAG #4 | VENDOR #3 | ADVERTISER #3 |
| ☐ | 5078600 | VAST TAG #5 | VENDOR #4 | ADVERTISER #4 |
| ☐ | 5078600 | VAST TAG #6 | VENDOR #5 | ADVERTISER #5 |
| ☐ | 5078224 | VAST TAG #7 | VENDOR #6 | ADVERTISER #6 |
| | | | VENDOR #7 | ADVERTISER #7 |

SEARCH AND FILTER BY...    ADD

ACTIONS... ▽

OPEN ORDER —— 218

INVESTIGATING —— 220

RESUBMIT ORDER —— 222

CANCEL ORDER —— 224

QUICK EDIT

OWNER
SMITH, JOHN  ▷

TRAFFICKER
NONE  ▷

APPLY

QC WORK ORDERS

VENDOR / PIXEL

ABOUT

LOG OUT

FIG. 11

SAME DOMAIN

```
          400
<   /Tracking>
▾<Tracking event="firstQuartile">
  ▾<![CDATA[
                              402
      https://s.vendor.com  /1x1.gif?
      project_hash=1h31of&client_id=2780&video id=533640&channel_id=172
  ]]>
<   /Tracking>
▾<Tracking event="midpoint">
  ▾<![CDATA[
      https://s.vendor.com  /1x1.gif?
      project_hash=1h31of&client_id=2780&video id=533640&channel_id=172
  ]]>
<   /Tracking>
▾<Tracking event="thirdQuartile">
  ▾<![CDATA[
      https://s.vendor.com  /1x1.gif?
      project_hash=1h31of&client_id=2780&video_id=533640&channel_id=172
  ]]>
<   /Tracking>
▾<Tracking event="complete">
  ▾<![CDATA[
      https://s.vendor.com  /1x1.gif?
      project_hash=1h31of&client_id=2780&video_id=533640&channel_id=172
  ]]>
```

FIG. 15A

DIFFERENT DOMAIN          430

```
      pproject_hash=1h31of&client_id=2780&video_id=533640&
      ]]>
  <   /Tracking>
  <   /TrackingEvents>
▾<VideoClicks>
  ▾<ClickThrough>
    ▾<![CDATA[                        432
        https://dts.vendor.com  /clkthru /action /vclk?
        project_hash=1h31of&client_id=2780&video_id=533640&
    ]]>
  <   /ClickThrough>
  <   /VideoClicks>
▾<MediaFiles>
  ▾<MediaFile delivery="progressive" width="1920" height="
    ▾<![CDATA[
        https://s-static.vendor.com  /assets /89748 /363570 /so
    ]]>
```

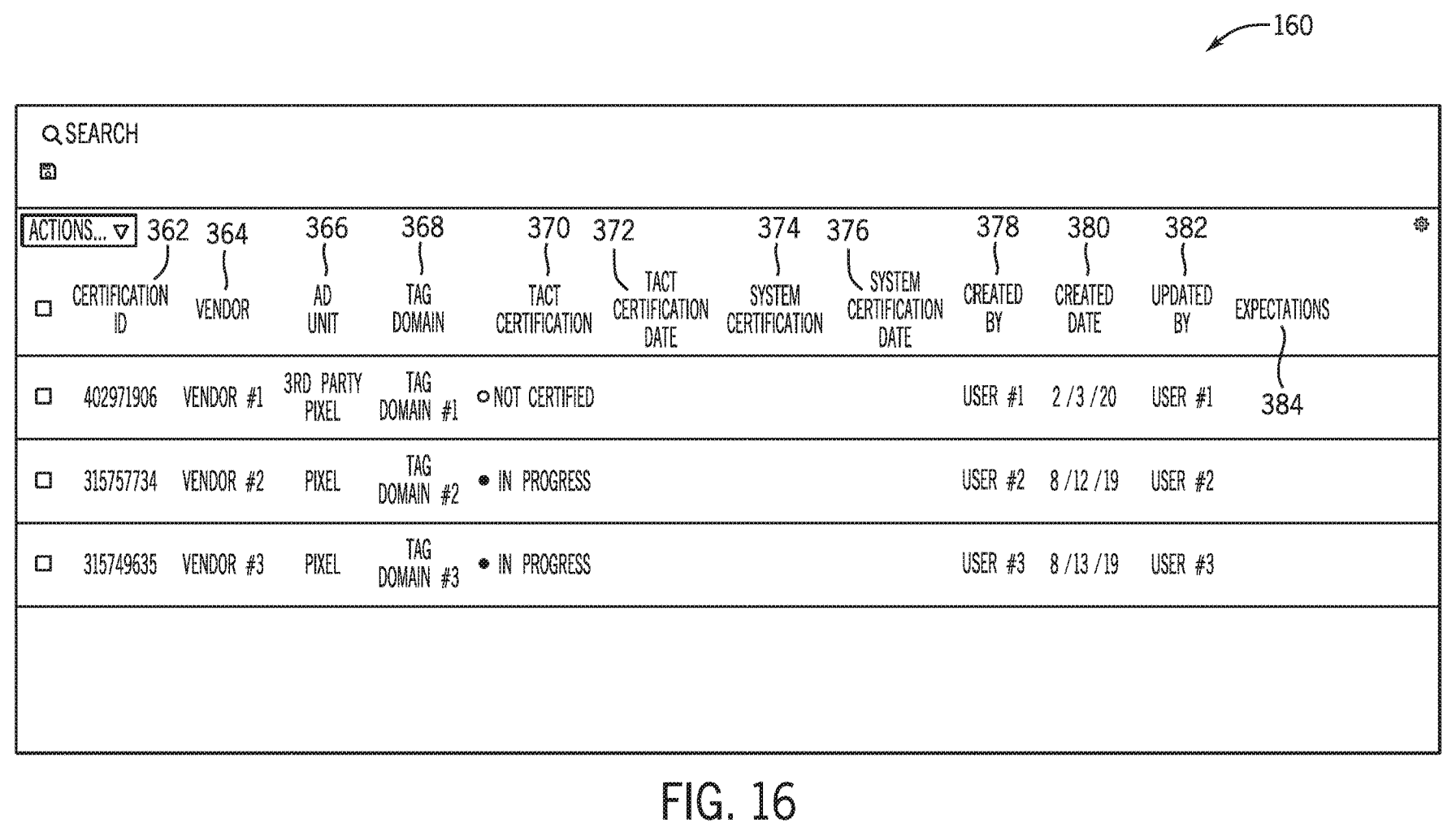

Q SEARCH

| | | 362 | 364 | 366 | 368 | 370 372 | 374 376 | 378 | 380 | 382 |
|---|---|---|---|---|---|---|---|---|---|---|
| ACTIONS... ▽ | | CERTIFICATION ID | VENDOR | AD UNIT | TAG DOMAIN | TACT CERTIFICATION / TACT CERTIFICATION DATE | SYSTEM CERTIFICATION / SYSTEM CERTIFICATION DATE | CREATED BY | CREATED DATE | UPDATED BY | EXPECTATIONS |
| ☐ | 402971906 | VENDOR #1 | 3RD PARTY PIXEL | TAG DOMAIN #1 | ○ NOT CERTIFIED | | USER #1 | 2/3/20 | USER #1 | 384 |
| ☐ | 315757734 | VENDOR #2 | PIXEL | TAG DOMAIN #2 | ● IN PROGRESS | | USER #2 | 8/12/19 | USER #2 | |
| ☐ | 315749635 | VENDOR #3 | PIXEL | TAG DOMAIN #3 | ● IN PROGRESS | | USER #3 | 8/13/19 | USER #3 | |

FIG. 16

SYSTEMS AND METHODS FOR CONTROLLING QUALITY OF CONTENT

CROSS REFERENCE RELATED TO APPLICATIONS

This application is a continuation of U.S. Non-Provisional application Ser. No. 16/951,752, entitled SYSTEMS AND METHODS FOR CONTROLLING QUALITY OF CONTENT," filed Nov. 18, 2020, which claims priority from and the benefit of U.S. Provisional Application Ser. No. 63/004, 845, entitled "SYSTEMS AND METHODS FOR CONTROLLING QUALITY OF CONTENT," filed Apr. 3, 2020. This U.S. Provisional Application is hereby incorporated by reference in its entirety for all purposes.

BACKGROUND

The present disclosure relates generally to content provision. More particularly, the present disclosure relates to systems and methods for controlling quality of content via a confidence tool.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Content providers often use quality control systems to monitor properties of content (e.g., advertisements or any other media content) before and after being deployed via content presentation services. Quality control systems may monitor content based on quality requirements and subsequently deactivate problematic content when the problematic content does not meet certain thresholds or requirements of the content presentation services. Unfortunately, content is oftentimes stored at third-party servers (e.g., servers of third party advertisers, third party vendors) and is oftentimes modified without notifying content providers. Monitoring content for any changes that do not meet quality requirements via manual intervention is not efficient and may result in a loss of time, resources, and revenue for content providers. Therefore, an automated quality control system that monitors quality of content at or near real time by pulsing content and deactivating problematic content may be useful to content providers and may improve user experience. In particular, by deactivating problematic content using the automated quality controls system, revenue of content providers is protected from losses in monetization due to problematic content interfering with content streams. Systems and methods for pulsing content are provided in detail in U.S. Prov. Pat. App. No. 63/004,832, entitled "SYSTEMS AND METHODS FOR PULSING CONTENT," filed Apr. 3, 2020, which is herein incorporated by reference in its entirety.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a tangible, non-transitory, machine-readable medium, which includes machine readable instructions, is provided. When executed by one or more processors of a machine, the machine-readable instructions may cause the machine to receive a request to analyze a tag indicating content to be presented at a content presentation service. The tag may include a link to the content and a tracking pixel associated with the content. Further, the instructions may cause the machine to identify criteria associated with the content presentation service, determine whether the tag meets the criteria, and provide a user notification indicating whether the tag meets the criteria.

In a further embodiment, a method for analyzing a tag is provided. The processor may receive a request to analyze a tag indicating content to be presented at a content presentation service. The tag may include a link to the content and a tracking pixel associated with the content. Further, the processor may identify criteria associated with the content presentation service, determine whether the tag meets the criteria, and provide a user notification indicating whether the tag meets the criteria.

In an additional embodiment, a confidence tool may include a memory and one or more processors. The one or more processors may receive a request to analyze a tag indicating content to be presented at a content presentation service. The tag may include a link to the content and a tracking pixel associated with the content. Further, the processors identify criteria associated with the content presentation service, determine whether the tag meets the criteria, and provide a user notification indicating whether the tag meets the criteria.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 3. is a graphical user interface (GUI) that depicts affordances for creating a work order within the quality control workflow of FIG. 2, in accordance with an embodiment of the present disclosure;

FIG. 7 is a GUI that depicts an expanded view of a work order panel, in accordance with an embodiment of the present disclosure;

FIG. 8 is a set of GUI elements that depict detailed view information of the work order panel, in accordance with an embodiment of the present disclosure;

FIG. 9 is a GUI that depicts a configurable layout of the work order panel, in accordance with an embodiment of the present disclosure;

FIG. 11 is a GUI that depicts a detailed view of the actions menu, in accordance with an embodiment of the present disclosure;

FIG. 15A is schematic drawing that depicts a domain of a pixel that correlates with a domain of a content tag, in accordance with an embodiment of the present disclosure.

FIG. 15B is a schematic drawing that depicts a domain of a pixel that does not correlate with a domain of a content tag, in accordance with an embodiment of the present disclosure;

FIG. 16 is a GUI that illustrates certification records corresponding to pixels, in accordance with an embodiment of the present disclosure;

DETAILED DESCRIPTION OF SPECIFIC EMBODIMENTS

Figure 1:
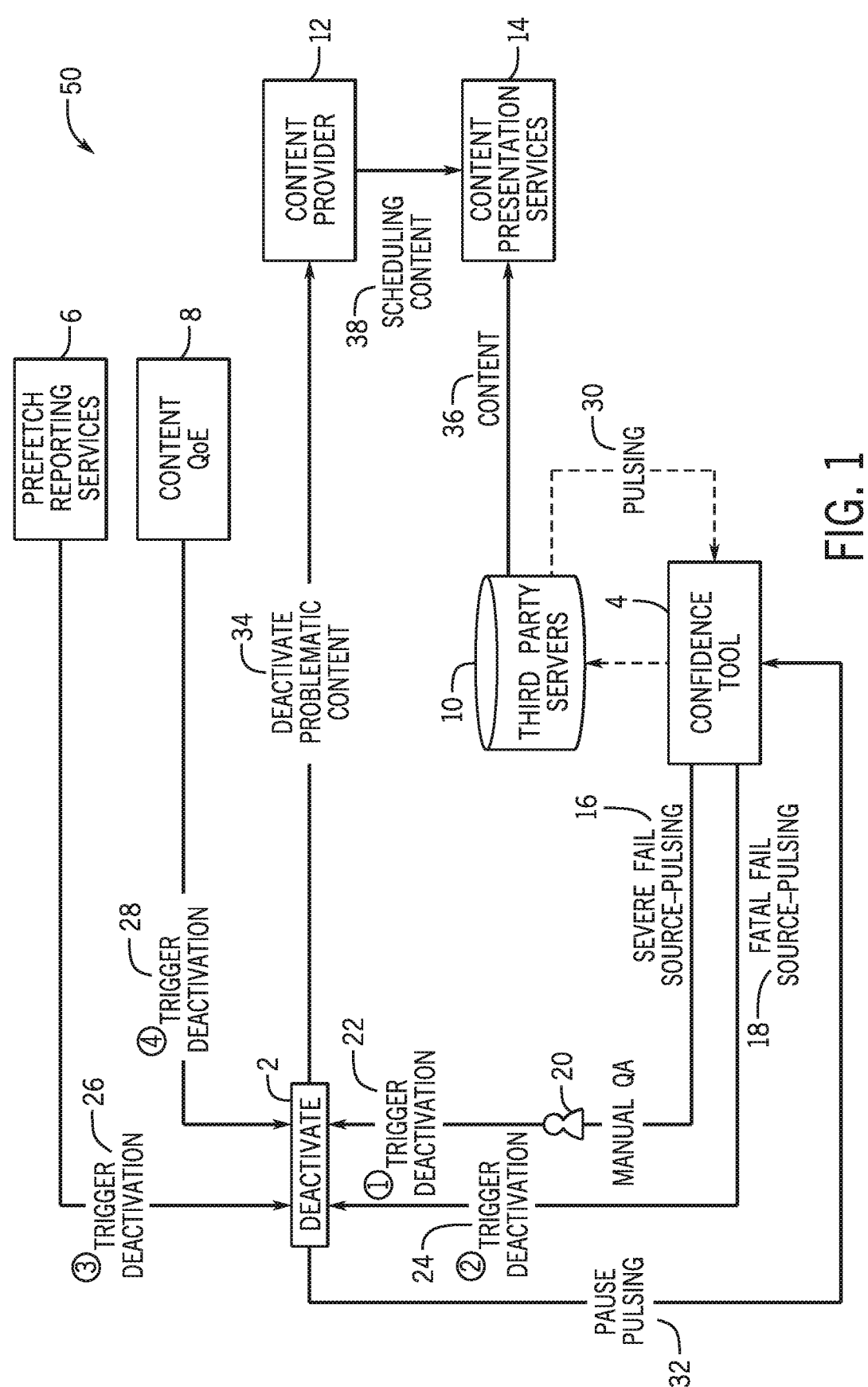
FIG. 1 illustrates a system that deactivates problematic content based on assessing quality of content, in accordance with an embodiment of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

As discussed in greater detail below, the present embodiments described herein improve efficiencies in monitoring quality of content (e.g., advertisements, commercial notices, marketing content, or another suitable secondary media content). Content may also be referred to as a creative. Before content is displayed via content presentation services or ad servers, the content undergoes a quality control process to ensure that quality requirements are met. However, even after content is deemed to have passed a quality control inspection, third-party servers (e.g., third party advertisers, third party vendors) may modify or add to a content file (e.g., video ad serving template (VAST)). A content file may contain one or multiple pieces content and may include information about the content regarding frame rate, bit rate, pixel size, duration, resolution, and so forth. Each content file may be associated with a content tag (e.g., VAST tag).

Conventional quality control systems involve manual intervention to check quality or changes in the content file and tag. Monitoring content in an efficient manner such that any modifications to the content file and tag by third-party servers are accurately detected continues to pose problems despite manual intervention efforts to control quality. As a result, a system that automatically monitors (e.g., pulses) content for any changes by third-party servers and subsequently deactivates problematic content files may improve user experience in relation to viewing content and enhance revenue gains for the content provider. For example, a confidence tool may identify problematic changes to a content file and tag via a pulsing mechanism, in which the content file and tag are identified for deactivation until changes to the content file and tag meet the specification of the content presentation services. Active (e.g., live) or in-flight (e.g., scheduled to be live) content files may continue being pulsed for any modifications unless they have been deactivated.

The pulsing mechanism is a component of the automated quality control workflow associated with the confidence tool. This automated quality control workflow includes interaction between a translator cloud (e.g., a user interface), a confidence tool cloud (e.g., decision-making component), a quality control system, a spot checker tool, and a content provider server. The translator cloud may be a user interface that the content provider (e.g., sales operation team) interacts with. Further, the translator cloud maintains a history of quality control associated with each content tag. To initiate the quality control process, the sales operation team may create a work order by entering metadata (e.g., tag URL, start date, advertiser, etc.) associated with the content tag received by the confidence tool from third-party servers. After the work order has been validated within the confidence tool cloud, the content tag is analyzed for quality via a quality control system and/or manually checked via a spot checker tool. In some embodiments, the content tag may be analyzed for quality via the quality control system and manually checked via the spot check. In other embodiments, the content tag may be analyzed for quality via the quality control system without being manually checked via the spot check. The quality control (QC) results (e.g., QC fail, QC pass) associated with the content tag are determined by the translator cloud. A message or notification indicating the QC results may be displayed via the translator cloud. The automated quality control workflow enables the sales operation team to check a work order history that includes QC results, deactivated status, pulsing status, comments from other users, and so forth in near or real-time.

With the preceding in mind, the following figures relate to systems and processes for controlling quality of content and/or subsequently deactivating problematic content. Turning now to FIG. 1, a schematic diagram of an embodiment of a system 50 is illustrated. The system 50 may include a deactivator component 2 that may include an application program interface (API) designed to automatically deactivate problematic content and provide a notification (e.g., to a sales team of a content provider 12) by providing useful feedback regarding the problematic content. As used herein, the term API may be defined as a communication protocol between a client and a server or in other words an interface implemented by an application, which allows other applications to communicate with it. An API may include a set of functions, methods, classes, or protocols that an operating system, library, or service provides to support requests made by computer programs. As will be described in more detail below, the deactivator component 2 may trigger deactivations based on an indication of a modification to the content and/or a problem with the content. A confidence tool 4, a prefetch reporting service 6, a content quality of experience (QoE) 8, and/or any combination thereof may generate this indication and request the deactivator component 2 to deactivate the problematic content.

In one embodiment, the deactivator component 2 may receive an indication of problematic changes to content via the confidence tool 4. The confidence tool 4 may receive content from third party servers 10 (e.g., third party advertisers, third party vendors) that provide content to content presentation services 14. In some instances as indicated by arrow 36, the content provider 12 may have employed the third-party servers 10 to send content based on the needs and directions of the content provider 12 to the content presentation services 14. As indicated by arrow 38, the content provider 12 controls which content is deployed and when the content is deployed to the content presentation services 14, or in other words regulates scheduling information (e.g., duration of content, tracking beacons associated with the content, media type associated with the content) provided to the content presentation services 14. An example of a content provider may be Freewheel, which is an ad serving service provider that may schedule ads for provision by the content presentation services 14 (e.g., YouTube and/or Hulu).

The third-party servers 10 may be associated with third-parties, such as creative or ad agencies that create marketing campaigns, ads, secondary video content, secondary audio content, and/or other content tailored to meet client needs. In some cases, the content received by the confidence tool 4 from the third-party servers 10 may not be live yet, or in other words has not been presented by content presentation services 14. The confidence tool 4 may serve as a quality control mechanism for such pre-live content (e.g., in flight content) as well as for content that is already live (e.g., active content). The confidence tool 4 performs pulsing 30, a mechanism that programmatically determines any changes made to receive content. Pulsing 30 may be performed on a continuous or periodic basis (every 1 second, every 1 hour, once a day, twice a day, or any suitable time period). The pulsing 30 operation may also be configured to be run on various schedules depending on attributes (e.g., advertiser, sales vertical) provided during work order creation in the translator cloud. The pulsing 30 operation may enable the confidence tool 4 to determine whether various attributes of the content abide by certain quality criteria (e.g., criteria of the content provider 12 and/or an entity commissioning the creation/editing of the content).

When the quality criteria are not met, the confidence tool 4 may provide an indication to the deactivator component 2, triggering deactivation of the content that does not meet the quality criteria. In some instances, different types of deactivation triggers may be provided to the deactivator component 2. In some embodiments different trigger levels may be implemented to indicate a severity or other characteristics of the problematic content. In the depicted embodiment, the confidence tool 4 may invoke the deactivator component 2 via a first trigger deactivation 22 or a second trigger deactivation 24. The first trigger deactivation 22 is based on problematic content related to a severe fail 16 that, while still allowing playback of the content, may eventually lead to a fatal failure where playback is blocked. Examples of problematic content associated with the severe fail 16 may include severe pixilation issues or spikes in audio. In some instances, problematic content associated with the severe fail 16 may involve manual intervention 20. For instance, if a problematic content may be susceptible to spikes in audio, a person may be assigned to listen to and investigate particular regions of the content for any spikes in audio. Meanwhile, the second trigger deactivation 24 is based on problematic content related to a fatal fail 18. Examples of the fatal fail 18 may include bit rate issues with the problematic content or broken uniform resource locator (URL) associated with the problematic content. For example, after selecting a URL, information regarding the content is absent due to a domain or vendor issue. As a result, the content may be identified as problematic and be an example of the fatal fail 18. The above-mentioned examples of severe and fatal fails serve as non-limiting examples, and parameters used to identify severe and fatal fails may be configurable. A more in-depth discussion entailing how the confidence tool 4 identifies problematic content based on pulsing will be described below.

Along with the confidence tool 4, the prefetch reporting service 6 may enable the deactivator component 2 to request deactivation of problematic content. The prefetch reporting service 6 generates and/or updates a content playback report based on data issued by the content provider 12 on a periodic basis (e.g., daily or any suitable time period). For example, the content playback report may contain data associated with the previous 32 hours or any suitable time period of content playback. The content playback report may include information related to the number of requests associated with the content (e.g., the amount of content expected to play) and the number of refreshes associated with the content (e.g., the amount of content actually played). Based on the information within the content playback report, the prefetch reporting service 6 may invoke the deactivator component 2 via a third deactivation trigger 26. For example, in some embodiments, if the ratio of an expected playback amount of a piece of content to the amount of actual playback of the piece of content exceeds a prescribed threshold, this may indicate that the piece of content should be deactivated, as there is a discrepancy between the expected and actual playback (e.g., which may be caused by refusal of playback by the content provider 12). The ratio can be inversed as well (amount of actual playback of content compared to the amount of expected playback of the content) in which case the content may be deactivated if the ratio is below a predetermined threshold.

In another embodiment, a fourth deactivation trigger 28 may invoke the deactivator component 2. The fourth deactivation trigger 28 may be generated by a content QoE 8. In some examples, the content QoE 8 may be referred to as video QoE. The statistics associated the content QoE 8 may help the deactivator component 2 identify and request deactivation of the problematic content. The content statistics received by the content QoE 8 as well as by the prefetch reporting service 6 relate to content that has been live, or in other words has been presented by content presentation services 14. The quality control features of the system 50 described above may not be limited to those discussed herein but rather the confidence tool 4, the prefetch reporting service 6, and the content QoE 8 are non-limiting examples of systems that may be used for monitoring quality of content. As indicated by arrow 34, the deactivator component 2 may request to the content provider 12 to deactivate the problematic content based on the trigger deactivations 22, 24, 26, 28, and any combination thereof.

Once problematic content has been deactivated, it may be unnecessary to check the content for problems again until the problems with the content have been fixed. In one embodiment, if the problematic content has been successfully deactivated, then the deactivator component 2 may request the confidence tool 4 to pause pulsing of the now deactivated problematic content as indicated by arrow 32. This may ensure that valuable computing resources are efficiently utilized for live and/or pre-flight content. Subsequently, prior to re-activation of the content (e.g., after fixing the problems with the content), the pulsing may be re-activated.

Figure 2:
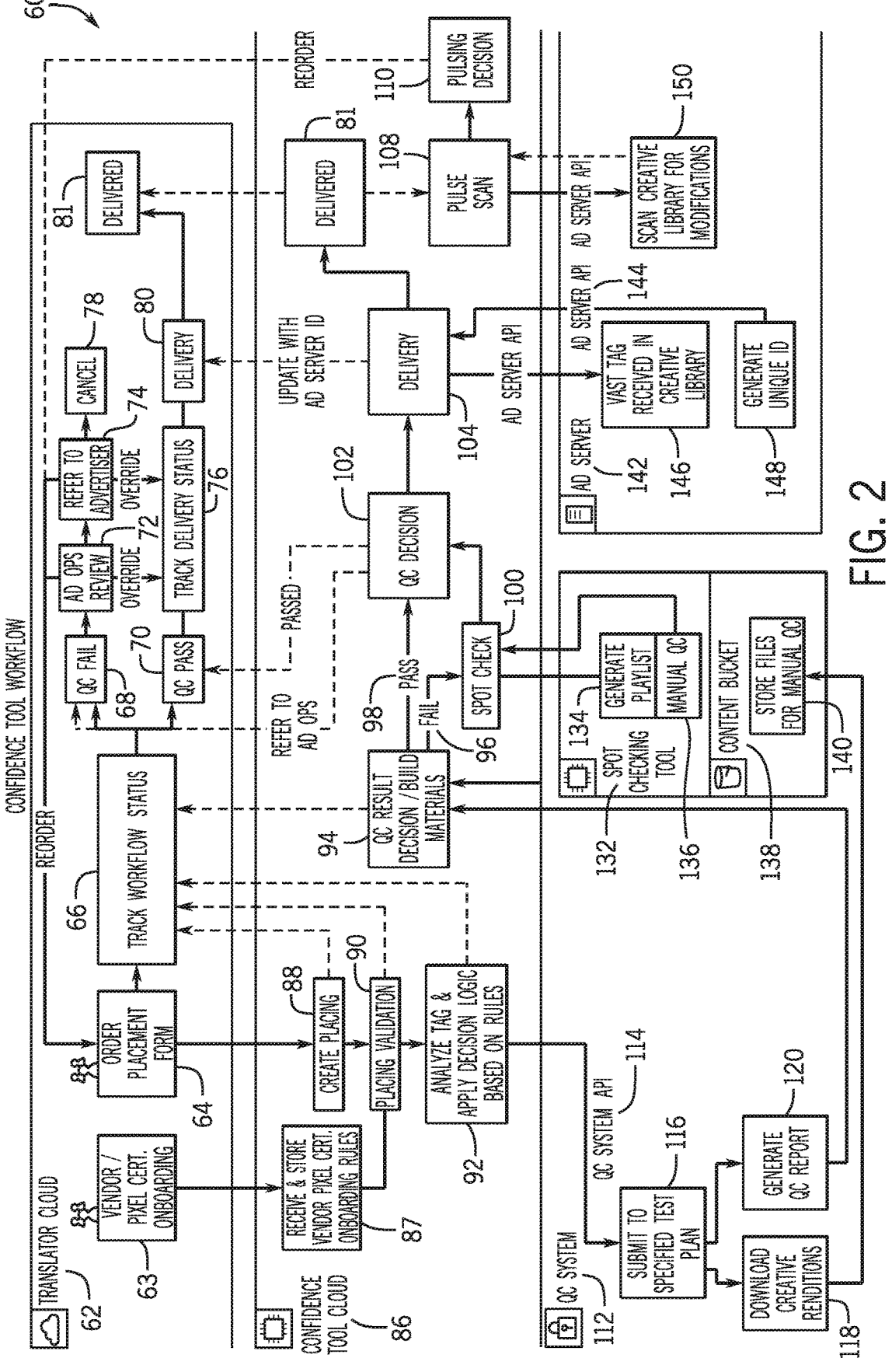
FIG. 2 is a quality control workflow associated with a confidence tool from the system in FIG. 1, in accordance with an embodiment of the present disclosure.

As mentioned above, the confidence tool 4 is a component of the automated quality control workflow. The confidence tool 4 ensures that content, even after being modified by third-party servers, meets the quality requirements of content presentation services 14. The confidence tool 4 may receive content tags associated with content files from third-party servers. A content file may contain one or more pieces of content and may include information about the content regarding bit rate, pixel size, duration, resolution, and so forth. The content file is a data structure that uses an XML, format to describe one or more pieces content to be displayed via a video player. A video player is an environment in which video content may be played. The automated quality control workflow monitors the quality of content associated with each content tag received by the confidence tool 4. With the preceding in mind, FIG. 2 illustrates the quality control workflow associated with the confident tool 4. Non-limiting components of the confidence tool workflow 60 include the translator cloud 62, the confidence tool cloud 86, the QC system 112, the spot checking tool 132, and the content provider server 142.

The translator cloud 62 serves as a user interface that the content provider (e.g., sales operation team) or a user may interact with. For example, a user may select a link or image that includes a tracking pixel via the user interface (block 63). As used herein, a tracking pixel may be a computer-interpretable snippet of code that collects information about users on a website (e.g., how users browse and/or a type of ad that users click on). Vendor tracking pixels are tracking pixels that are associated with a particular domain (e.g., vendor.com) that identifies a vendor associated with the tracking pixel. The information stored based on the tracking pixel may be received and analyzed by the confidence tool cloud 86 (block 87). Information such as type of client or vendor used, and the like may be received by the confidence tool cloud 86. Further, the translator cloud maintains a history of work orders, QC results, and other QC checks associated with each content tag. As a result, the automated quality control workflow enables the sales operation team to review a work order history, QC results, and other QC checks associated with the content tag via the translator cloud near-real or real-time. In order to initiate the process of quality control for a content tag, the sales operation team may create a work order by entering metadata (e.g., tag URL, start date, advertiser, etc.) associated with the received content tag via the order placement form 64. The order placement form 64 is submitted in the translator cloud 62 and is associated with an order data type. The order data type may be in the format of a string and may include input fields such as name and ID of advertiser, start and end time of content, name and ID of campaign, name of vendor, vertical (e.g., industry in which vendors offer goods and services), type of content file, and so forth. A campaign may be defined as a series of content for a particular theme or marketing platform. Based on the inputted information, a content URL or unique ID may be outputted due to the order data type. The content URL or unique ID may be used to analyze quality of respective content.

Since the translator cloud 62 serves as a user interface, the user (e.g., sales operation team) of the content provider 12 may be able to interact with a computer in a visual way using items such as windows, icons, menus, and so forth. In turn, FIG. 3 is a graphical user interface (GUI) 160 that depicts creation of a work order, in accordance with an embodiment of the present disclosure. In order to create a work order and submit the order placement form 64, a work order icon 162 may be selected from a work order panel. The work order panel may include a history of previous work orders. Information related to previous work orders may be categorized based on columns associated with campaign order ID 164, content name 166, vendor 168, advertiser 169, vertical 172, date of content creation 174, who created the content 176, start date of content 178, QC results 180, what domains 182 the content is cleared for, QC progress 184, and so forth.

Figure 4:
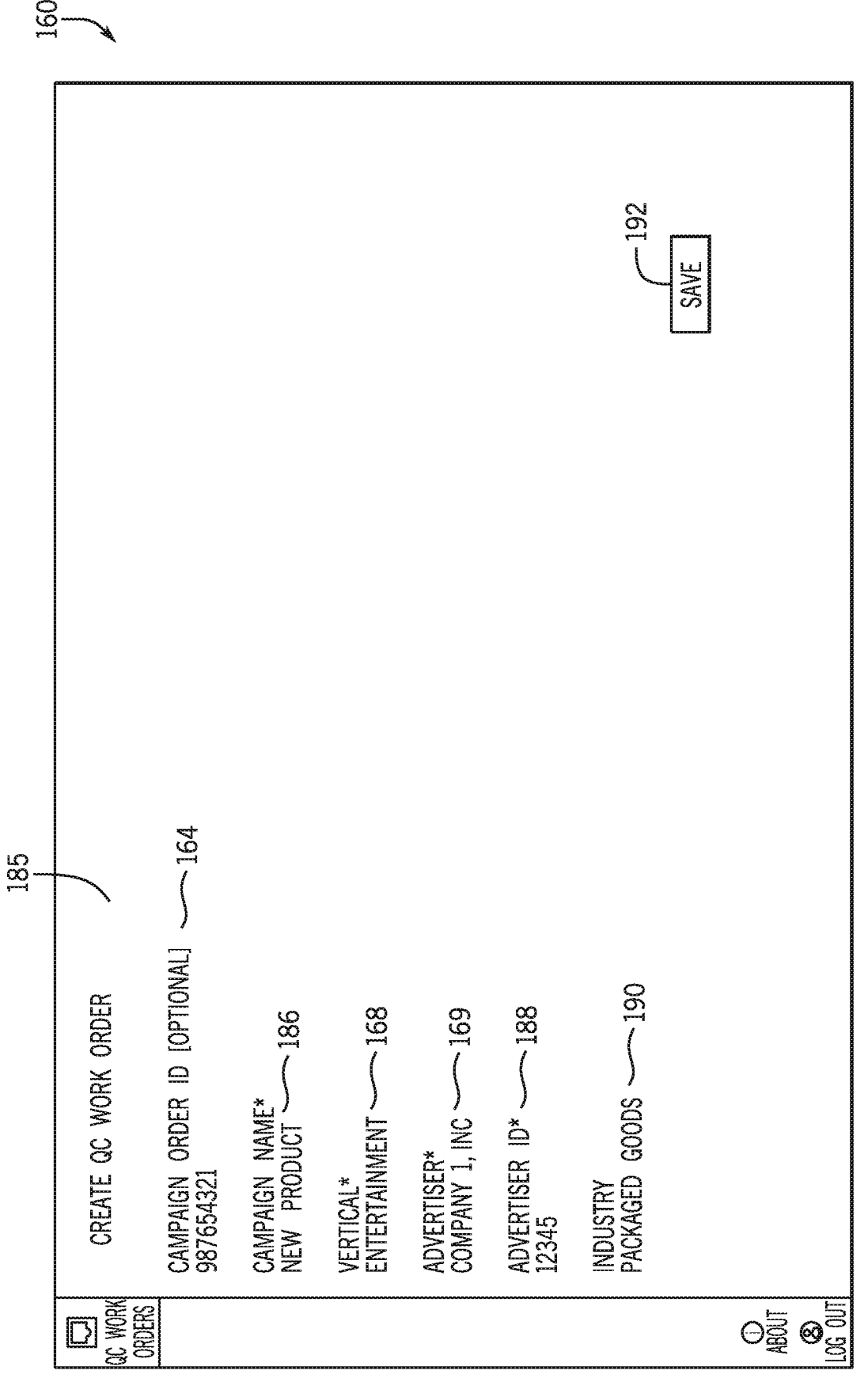
FIG. 4 is a GUI of that depicts information associated with campaigns in creating the work order, in accordance with an embodiment of the present disclosure.

After the work order icon 162 is selected, another window may open via the GUI 160. FIG. 4 depicts a window 185 for entering in relevant campaign information associated with the secondary tag in the order placement form 64. As mentioned previously, a campaign may serve as a series of content for a particular theme or marketing platform. As shown in FIG. 4, a campaign order ID 164 associated with the content tag may be inputted into the order placement form. If a content tag is used for multiple work orders, the campaign order ID field may be updated to include each relevant campaign ID. Further, inputting the campaign order ID 164 may be optional. Along with campaign order ID, a campaign name 186 may be typed into the campaign name field, which may, in some embodiments, be a required field.

The vertical 172 and the advertiser 169 associated with the content tag may be selected via a dropdown menu. As used herein, the vertical 172 is associated with the industry (e.g., news, entertainment, online content service) in which a vendor offers content. Selecting the vertical 172 and the advertiser 169 may be required in some embodiments. The advertiser ID 188 and the industry fields 190 may be automatically populated based on selecting the advertiser. If an advertiser is not found via the dropdown menu, the content provider 12 may be notified via email or another form of communication. After campaign information in the order placement form 64 is filled out, a save button 192 may be pressed to save the information and move to the next page.

Figure 5:
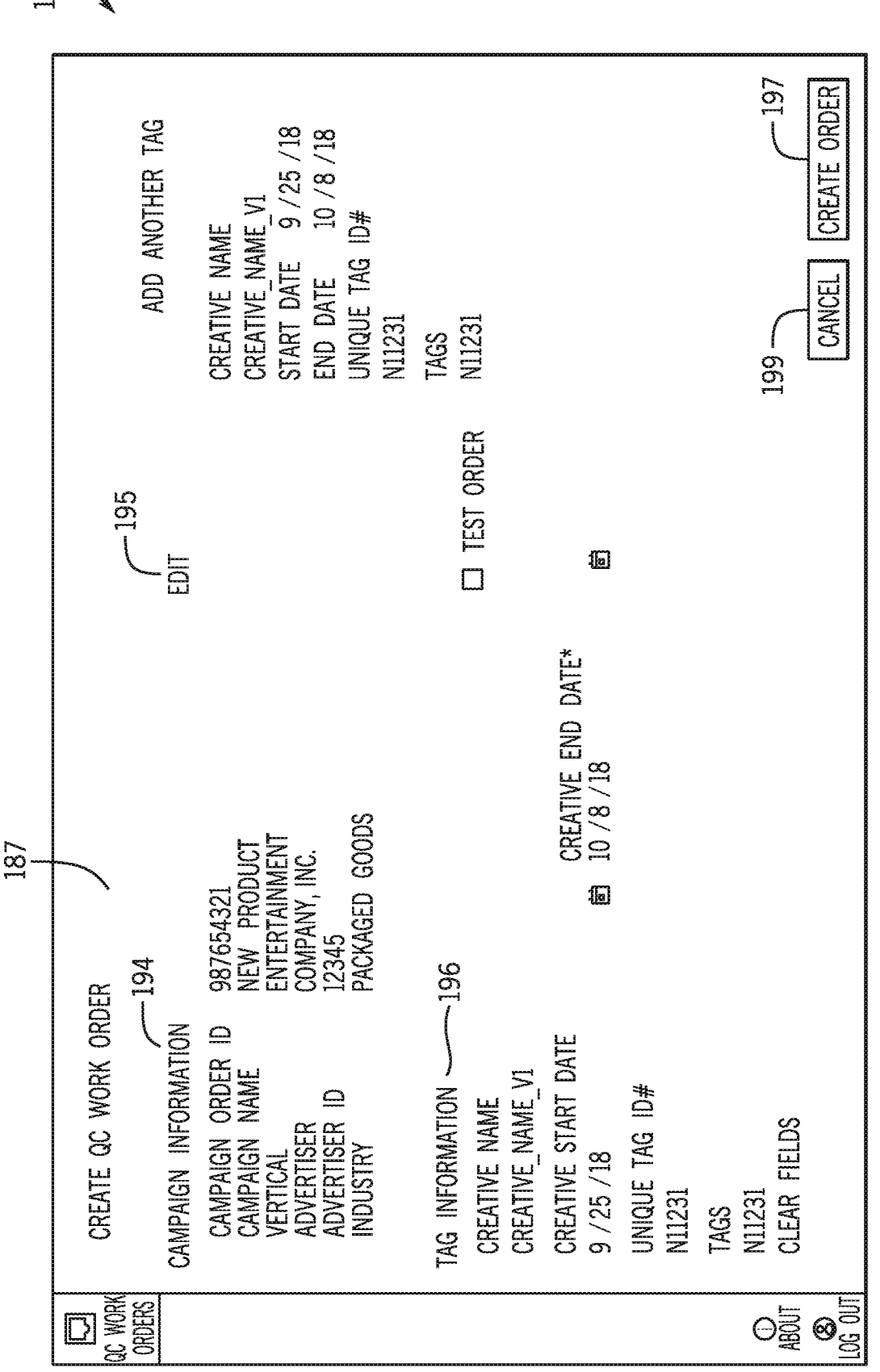
FIG. 5 is a GUI that depicts information associated with content tags in creating the work order, in accordance with an embodiment of the present disclosure.

Once the basic campaign information is saved, the next page 187 involves entering content tag information. As such, FIG. 5 depicts inputting content tag information via the GUI 160. As shown FIG. 5, the tag information may include: a content name, creation date of content, unique content tag ID, and full content tag, each of which may be inputted into the order placement form 64. In some embodiments, the content tag ID may not be edited once submitted. The unique content tag ID may be used to identify a particular content. As used herein, the full content tag may include a URL link associated with the content tag. The URL link may include a domain (e.g., www.xyz.com) that is unique to a vendor corresponding to the content tag. That is, each domain corresponds to a single vendor.

Information associated with another content tag may be added if a campaign has multiple content tags. Clicking the edit button 195 redirects to the window 185 in FIG. 4 to edit the campaign. After relevant campaign 194 and content tag information 196 is inputted, a create order button 197 may be clicked to generate a new work order. The new work order may appear on the work order panel as well after the new work order has been created. Otherwise, clicking the cancel button 199 closes the order placement form 64 and redirects back to the work order panel. In some embodiments, the QC system 112 also runs a duplicates check to ensure that the same content tag is not used twice, thereby avoiding creating duplicate work orders.

Figure 6:
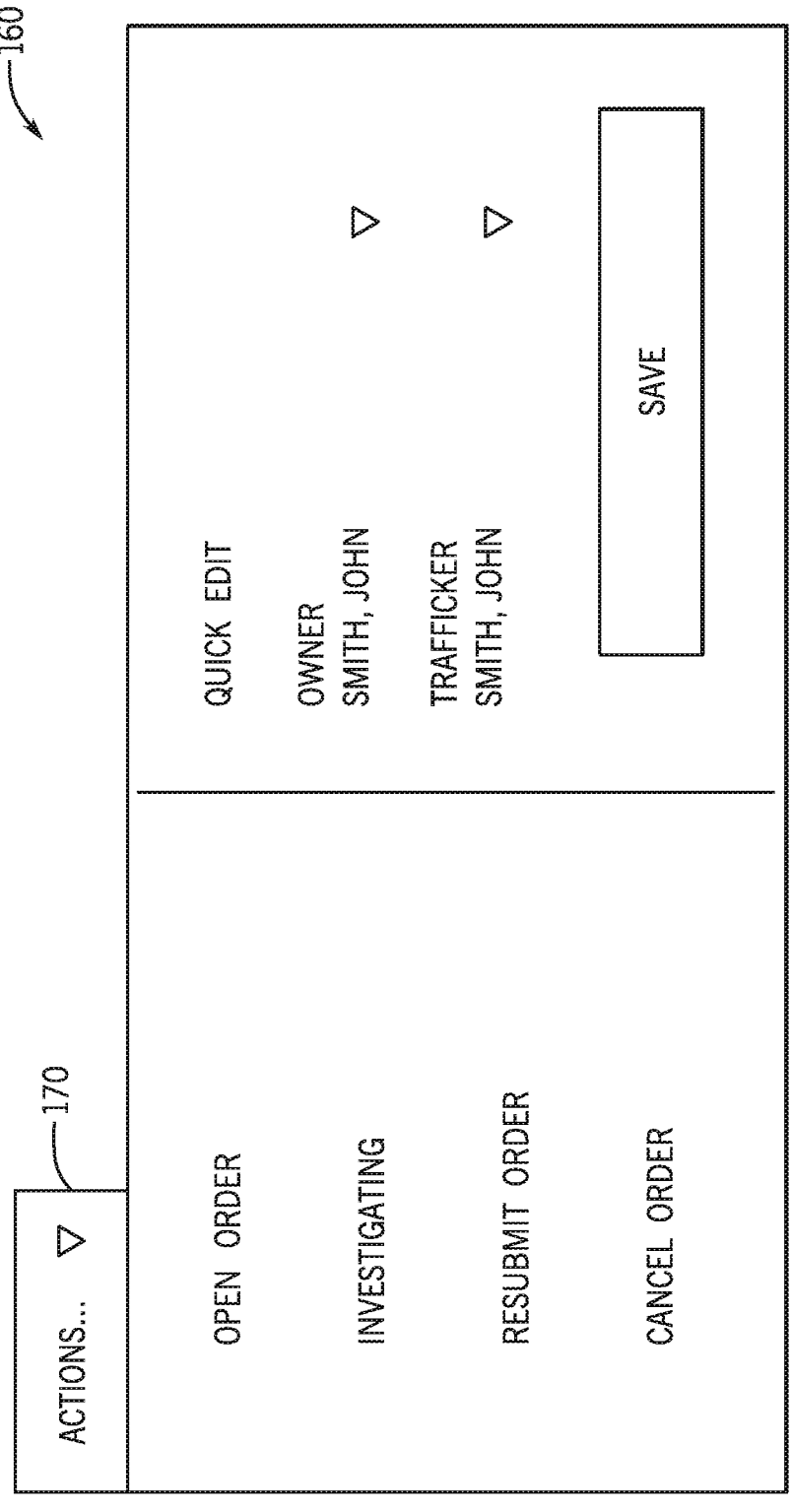
FIG. 6 is a GUI element that depicts an actions menu associated with the work order, in accordance with an embodiment of the present disclosure.

FIG. 6 depicts an actions menu 170 associated with placing a work order. Order creators (e.g., those users that create the actual order via the GUI 160) are by default assigned as the owner. However, order owners and traffickers (e.g., users who create, edit, and/or update the work order) may be updated via the actions menu 170 of the GUI 160. The actions menu 170 has options for opening an order, investigating, resubmitting an order, canceling an order, and so forth. When creating an order for one's own account, one may assign him or herself as the owner and assign a trafficker. When creating an order for someone else's account, he or she who owns the account may be assigned as the owner, and a trafficker may be assigned as well.

Figure 7:
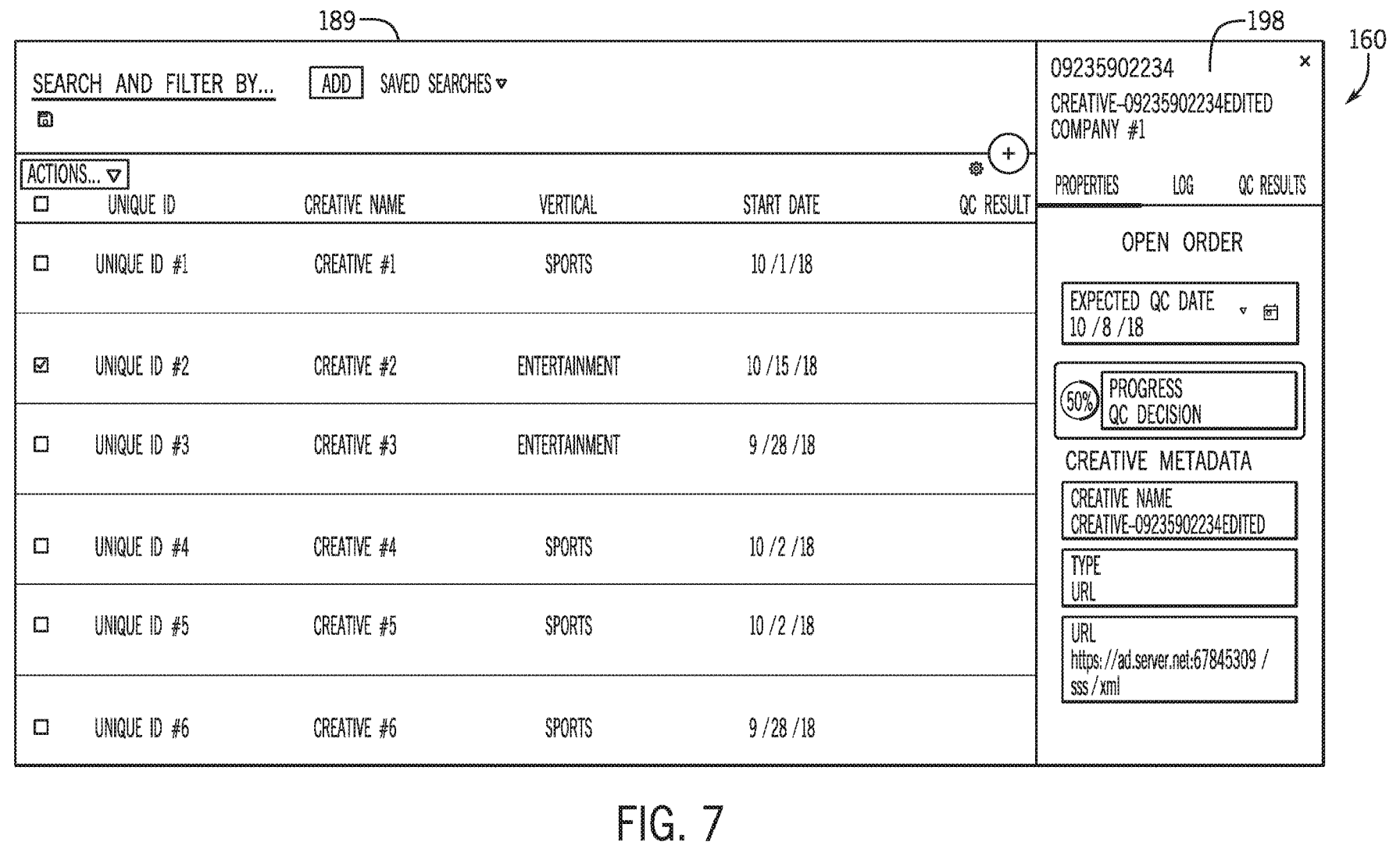

As mentioned above, the work order panel may display a history of work orders and may categorize the work orders based on content name and ID, vertical, start date, QC result, and so forth. As such, FIG. 7 is an expanded view 189 of the work order panel. Selecting a particular work order expands a side panel 198. As shown in FIG. 7, the side panel 198 includes information about the work order such as progress state, QC results, content metadata, campaign information, content tag information, trafficker information, QC due date, and so forth.

FIG. 8 is a detailed view of portions of the work order panel of the GUI 160. As indicated by portion 200, the work order panel may be used to view content metadata or an overview of the content tag information (e.g., content URL). The campaign information that was inputted in the order placement form 64 may be viewed via a first portion 202. A second portion 204 displays content tag information that was inputted via the order placement form 64. Trafficker information, which is user information regarding order creation, edits, and updates, may be viewed in a third portion 206.

Figure 9:
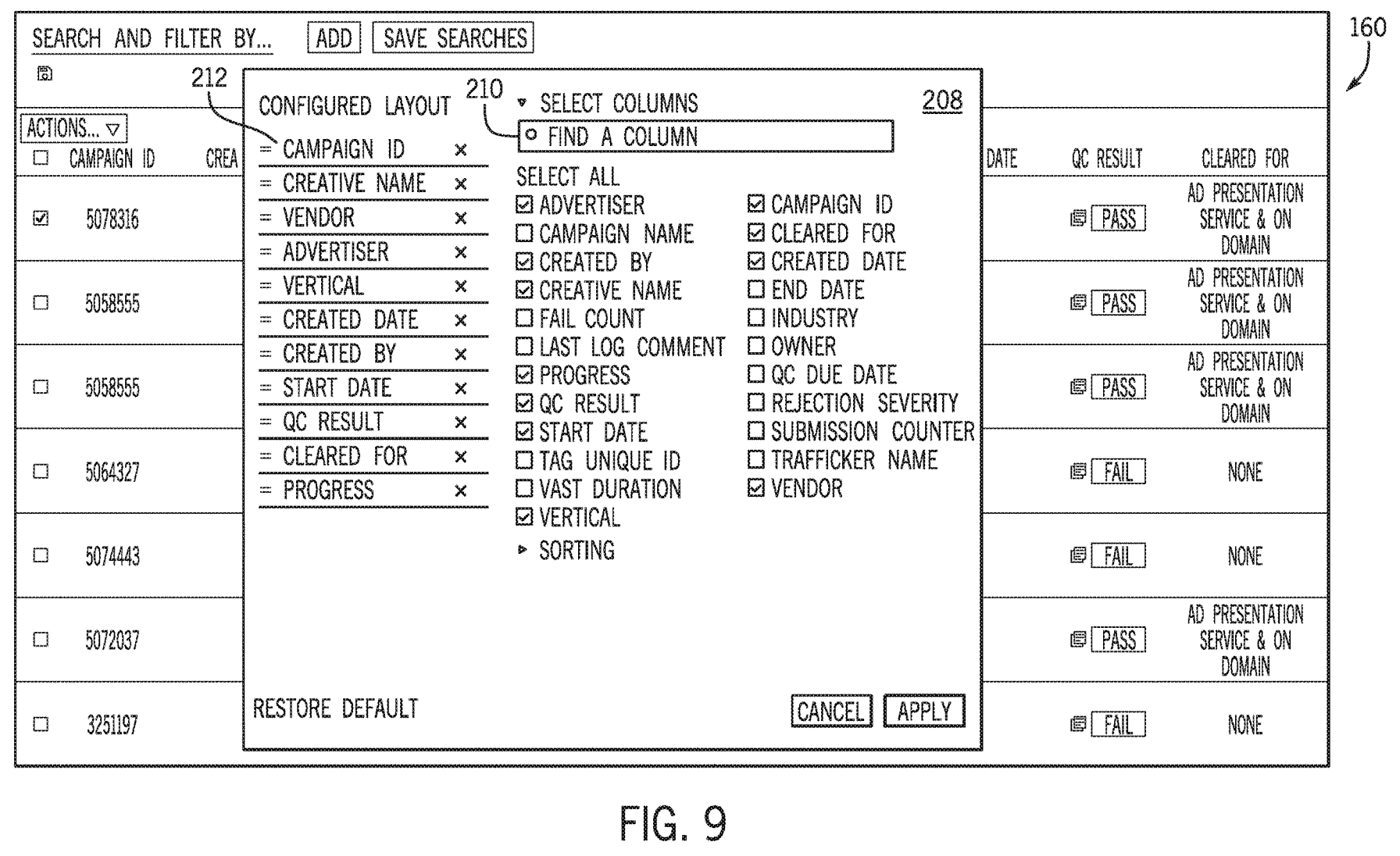

The work order panel may be configurable by a user by selecting a settings icon. As such, FIG. 9 is a configured layout of the work order panel of the GUI 160. At 208, a user may select boxes to add columns (e.g., campaign ID, content name, QC results) to the work order panel. In the current embodiment, clicking "X" 210 removes a particular column from view in the work order panel. Further, clicking on a double line 212 and dragging enables reorganizing the column order.

Figure 10:
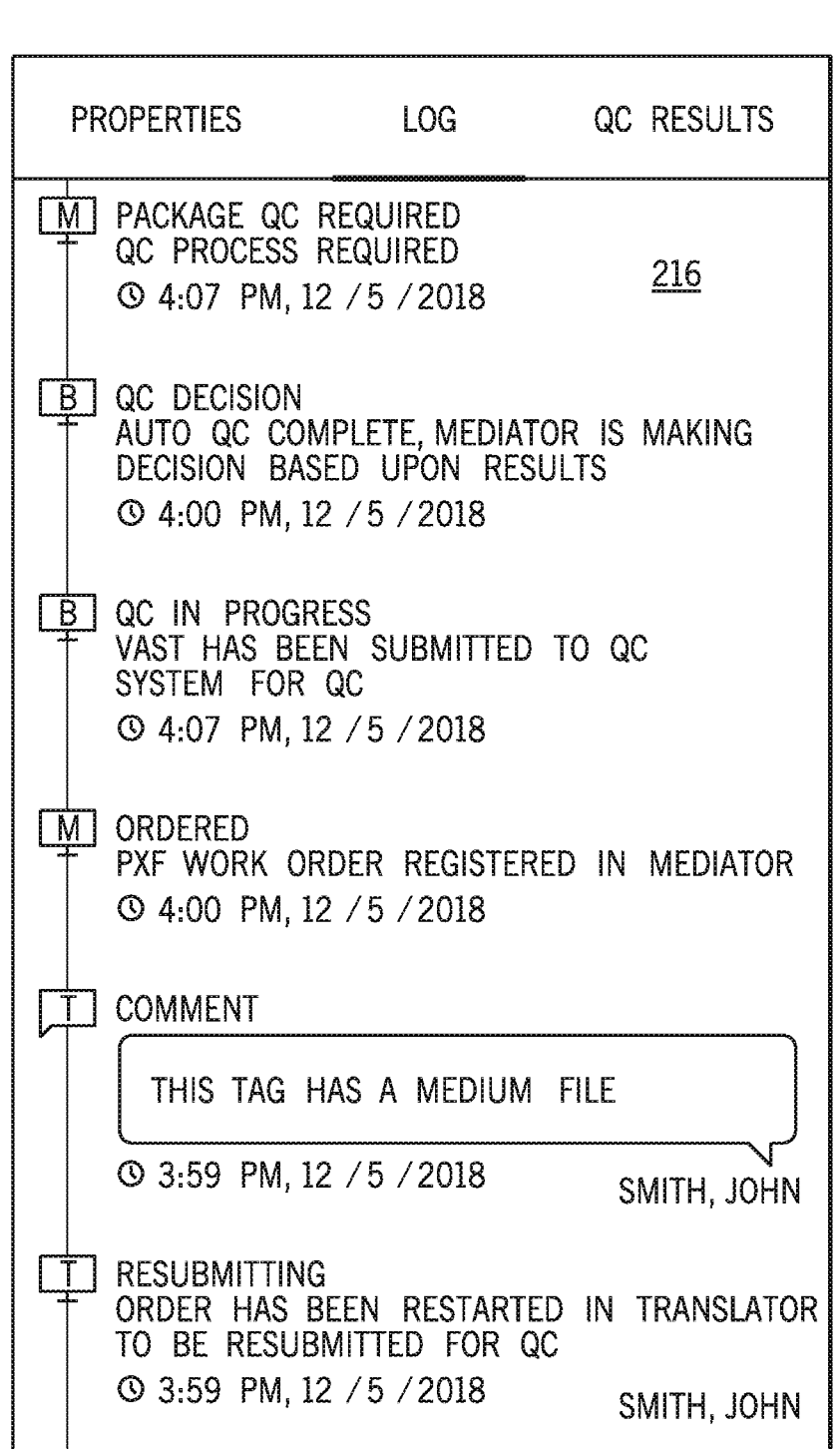
FIG. 10 is a GUI that depicts a work order history, in accordance with an embodiment of the present disclosure.

FIG. 10 depicts a work order history 214 that is accessible via the work order panel. The work order history captures a log of comments 216 associated with the work order. In some embodiments, the log includes a log state or name with a definition describing the state and/or user made comments. Further, the work order history includes time and date stamps as well as the username of the individual who conducted a log activity. Additionally, the work order history provides the user with information regarding which system (e.g., QC system 112, spot checking tool 132, and so forth) the work order is presently involved with. Different icons, symbols, or abbreviations may represent various systems in the work order panel.

As mentioned above, the actions menu 170 may be used to perform certain functions on a work order. As such, FIG. 11 depicts a detailed view of the actions menu 170. In order to open the actions menu 170, one or more work orders may be selected. An option for opening an order 218 allows for the order to be edited. An investigate option 220 allows orders that are being looked into or reviewed to be marked. An option to resubmit order 222 restarts the QC process on a content tag. Further, a cancel order option 224 allows an order that no longer needs to be quality controlled to be canceled.

Figure 12:
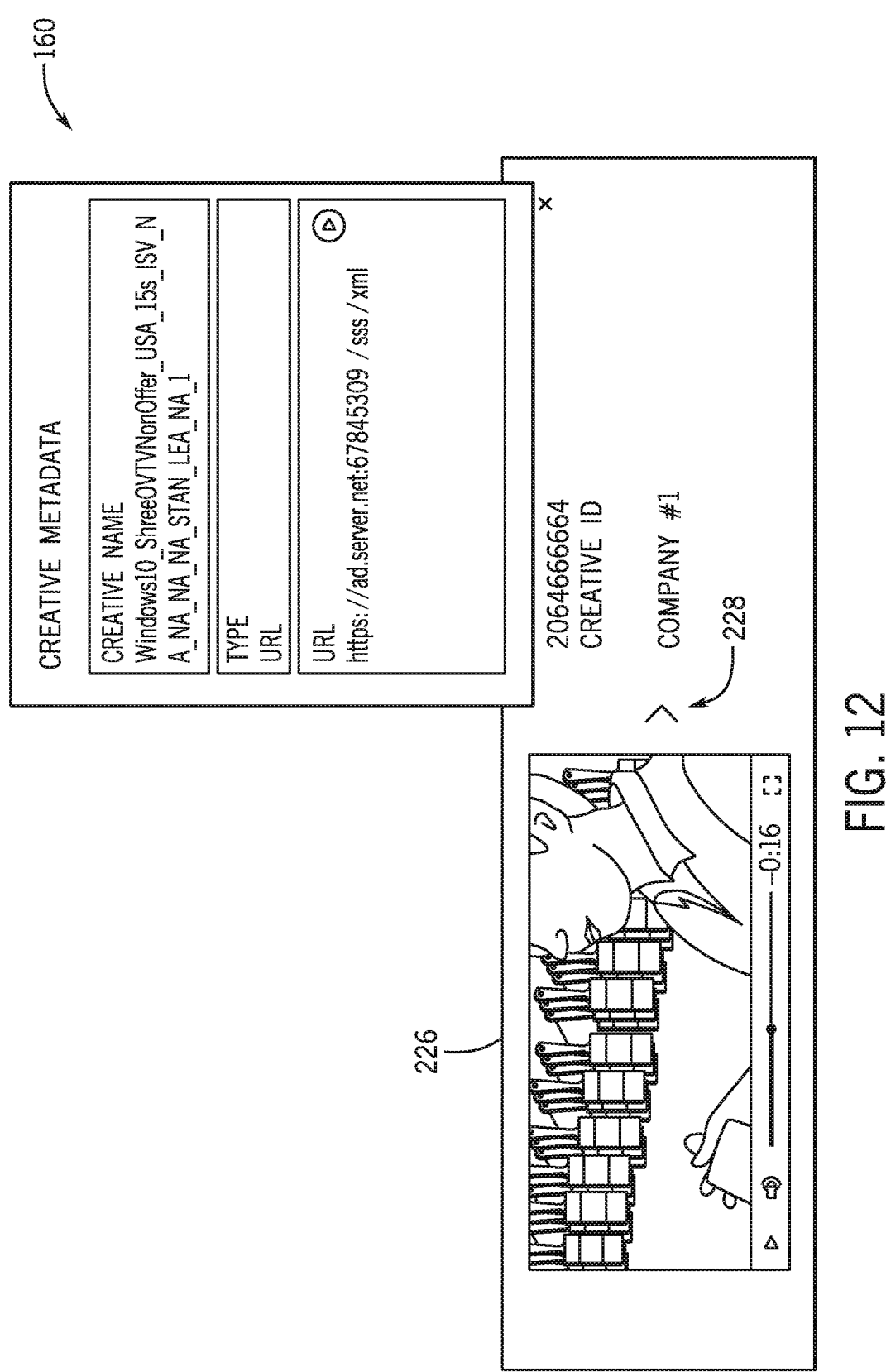
FIG. 12 is a GUI that facilitates previewing a content, in accordance with an embodiment of the present disclosure.

FIG. 12 illustrates a portion of GUI 160 that enables a content to be previewed. After selecting a preview feature near the content tag URL in the work order panel, a content preview 226 may open. Selecting an affordance 228 may reload a video based on a refresh feature. If multiple contents are present, each one can be viewed due to the refresh feature and respective content tags are displayed in the GUI 160.

Referring back to FIG. 2, after the work order has been created in the translator cloud 62, a placing is created (block 88) in the confidence tool cloud 86, which controls QC results and decision-making with respect to the content tags. As described further, the confidence tool cloud 86 updates the user interface of the translator cloud 62 and communicates with a QC system 112, a spot checking tool 100, and/or a content provider server 142. Placing validation 90 may be performed to verify that the content tag is certified, can be properly parsed, and can be passed on to other steps of the QC process. If the placing is not valid or the content tag does not pass, a message indicating an error workflow status may be displayed via the translator cloud 62. After the placing is determined to be valid, the content tag may be analyzed based on rules or testing parameters (block 92). The rules or the testing parameters may be configurable based on the type of content associated with the content tag. Content with a higher risk or higher sensitivity (e.g., child protected content) may have different parameters compared to content with lower risk or lower sensitivity (e.g., ad re-runs). In some embodiments, the parameters may be set by requirements or other criteria of the content provider 12 and/or an entity commissioning the content. Examples of such parameters include but are not limited to minimum bit rate, aspect ratio, resolution, frame rate, color space, and/or format specifications. In additional embodiments, the threshold requirements may be based on criteria set by operators of third-party servers 10 who sent the content tags and/or may be set to meet criteria of content presentation services 14. Flexibility in changing testing parameters for various types of content and content tags allows for a variety of content and content tags to be monitored for quality. Based on the rules or testing parameters, the QC system 112 may analyze the content tags received from third-party servers. The QC system 112 may be a third-party tool or may be a part of the confidence tool 4. Further, the QC system 112 may be an application program interface (API) (block 114) designed to automatically check the quality of content tag based on particular testing parameters.

As mentioned above, the confidence tool cloud 86 may also validate and/or analyze pixels wrapped within the content tag (e.g., VAST tag) or pixels associated with the content tag. Each content tag may correspond with at least one type of pixel. Non-limiting examples of types of pixels include vendor tracking pixels, fourth party tracking pixels, and third party tracking pixels.

Vendor tracking pixels may be found in the tracking events within the XML, of a content file (e.g., VAST) via quartile pixels, default impressions, click through events, mute or unmute features, and so forth. In some embodiments, click through events may be analyzed based on the ratio of users who click on a specific link and/or the number of users who view the content associated with the content tag. Vendor tracking pixels may be snippets of code that collect information about users on a vendor website (e.g., how users browse, type of ads users click on).

As used herein, fourth party tracking pixels may be vendor pixels wrapped in another vendor's content tag (e.g., VAST tag). For example, a content tag may correspond to a particular vendor, but tracking events associated with the content tag may correspond to another vendor. Third party tracking pixels may include research and tracking pixels added as additional tracking pixels in the content tag. In particular, third party tracking pixels may be located in an impression line or towards the bottom of the XML of the content file associated with the content tag in an extension type field. The confidence tool cloud 86 may determine whether pixels associated with the content tag are certified and/or recognized based on comparing the pixels with a list of registered or certified pixels and/or pixel whitelisting criteria. If a pixel is not certified or not recognized, the confidence tool cloud 86 may determine a QC fail for the content tag. QC decisions such as QC fail will be described in greater detail below.

Figure 13:
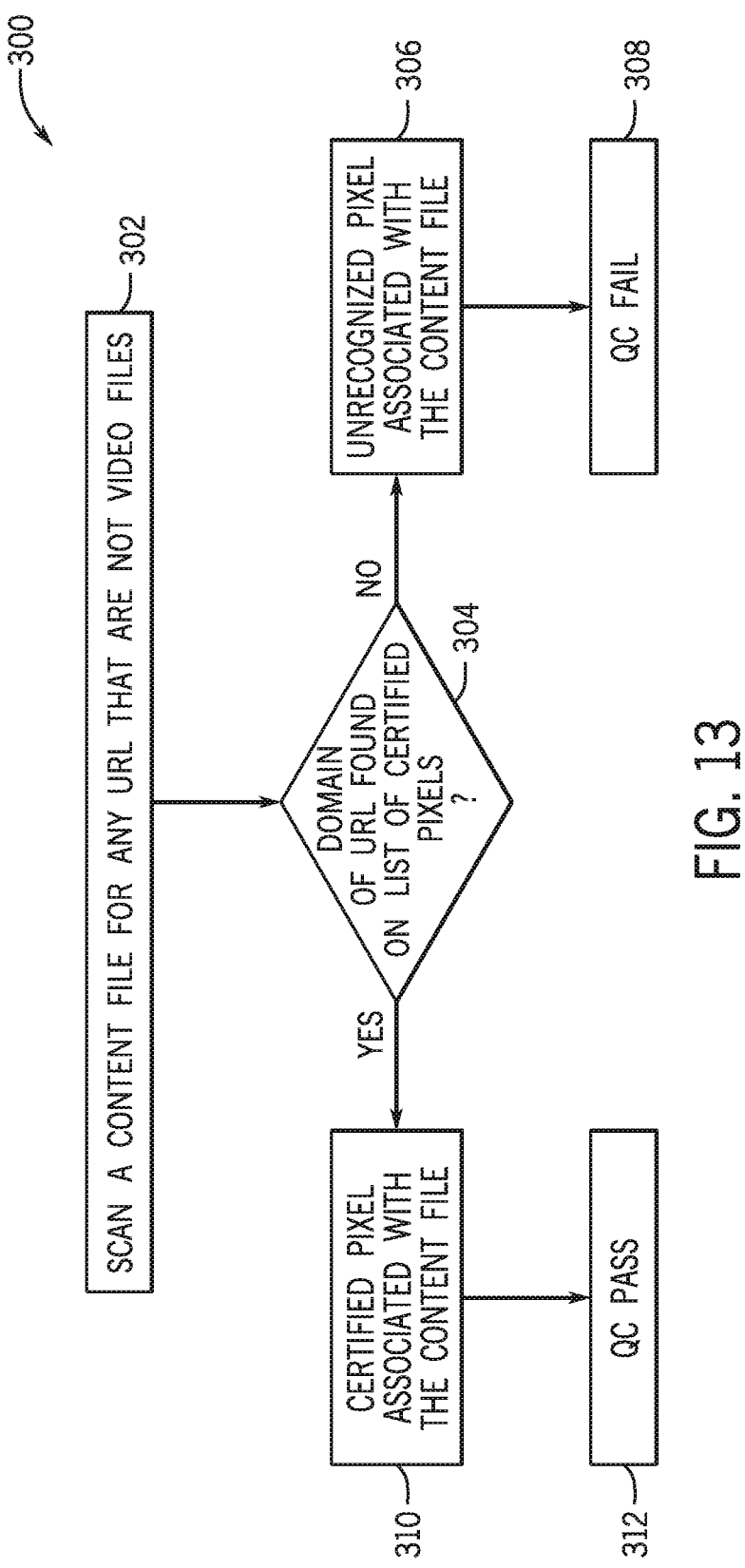
FIG. 13 is a flowchart that illustrates a process for determining whether pixels associated with a content tag are certified, in accordance with an embodiment of the present disclosure.

As such FIG. 13 depicts a flowchart of a process 300 associated with determining whether pixels associated with the content tag are certified, in accordance with an embodiment of the present disclosure. The process 300 may be performed by any suitable device such as the confidence tool cloud 86 or the confidence tool 4. While the process 300 is described using steps in a specific sequence, it should be understood that the present disclosure contemplates that the described steps may be performed in different sequences than the sequence illustrated, and certain described steps may be skipped and/or not performed altogether. In some embodiments, the process 300 may be implemented by executing instructions stored in a tangible, non-transitory, computer-readable medium within the confidence tool cloud 86 or the confidence tool 4.

The confidence tool cloud 86 scans the entire XML for any URLs that are not video files (block 302). These URLs may be identified as pixels within the XML.

The confidence tool cloud 86 checks if a domain (e.g., www.vendor.com) of the URL is associated with one of the pixels certified on the list of certified and/or recognized pixels (block 304). As used, the domain is unique to a vendor corresponding to the content tag. That is, each domain corresponds to a single vendor.

If the domain in the XML is not found on the list of certified and/or recognized pixels, then the confidence tool cloud 86 determines the pixel associated with the domain is an unrecognized pixel (block 306). In other words, the pixel is sourced from an unexpected domain that is not found in a list of expected domains associated and is therefore an unrecognized pixel. The confidence tool cloud 86 may determine the unrecognized pixel to be a QC fail (block 308).

However, if the domain in the XML is found on the list of certified and/or recognized pixels, then the confidence tool cloud 86 determines the pixel associated with the domain is a certified pixel (block 310). Accordingly, the confidence tool cloud 86 may determine the certified pixel to be a QC pass (block 312).

In some embodiments, when analyzing click through events or other types of pixels in the XML, the confidence tool cloud 86 may allow unrecognized domains to pass (e.g., QC pass) when clicking through various webpages, links, and so forth, but the confidence tool cloud 86 may indicate or provide feedback related to pixel associated with the unrecognized domain associated with the click through events.

Figure 14:
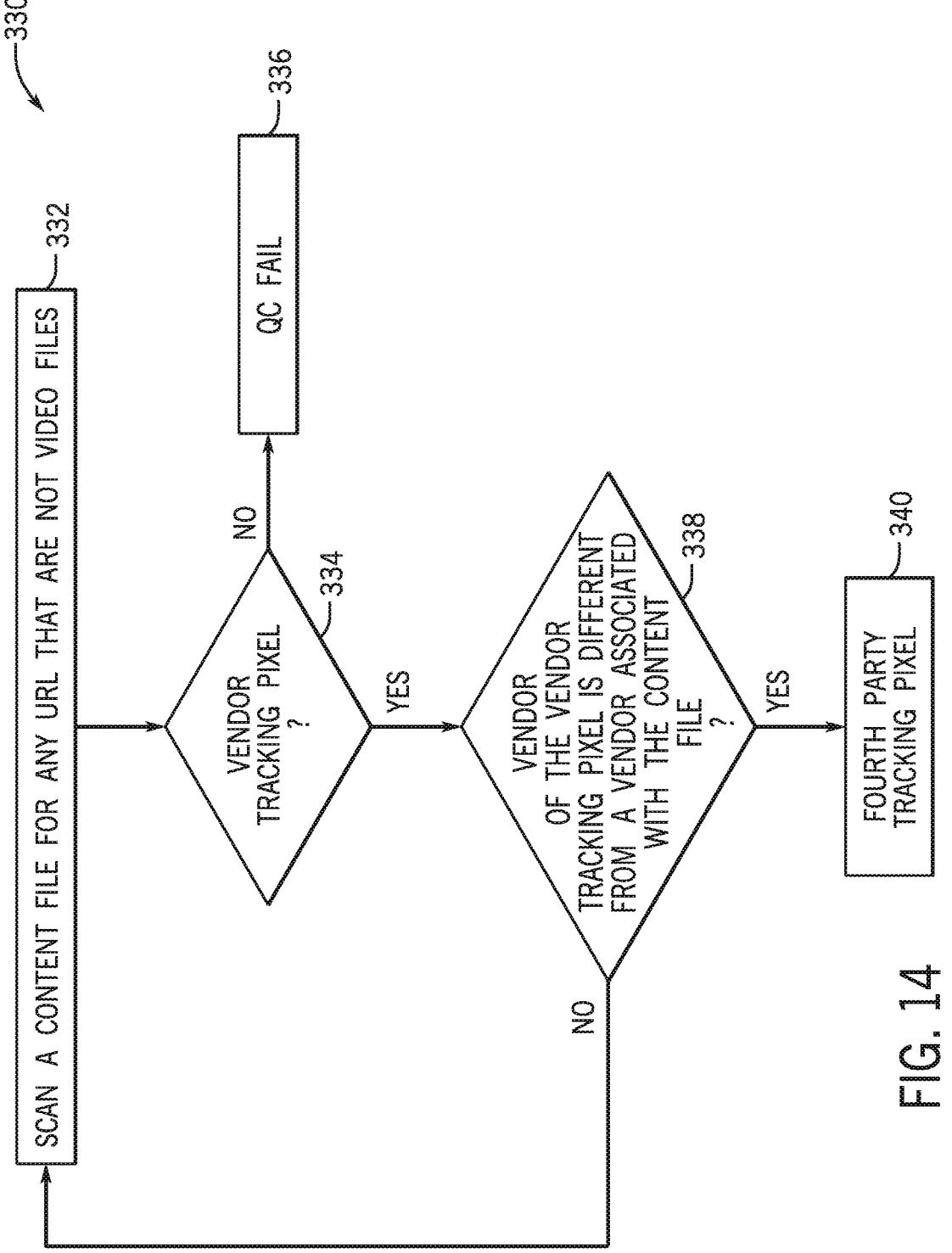
FIG. 14 is a flowchart that illustrates a process for determining whether a pixel is a fourth party tracking pixel, in accordance with an embodiment of the present disclosure.

FIG. 14 depicts a flowchart of a process 330 associated with determining whether pixels are fourth party tracking pixels, in accordance with an embodiment of the present disclosure. The process 330 may be performed by any suitable device such as the confidence tool cloud 86 or the confidence tool 4. While the process 330 is described using steps in a specific sequence, it should be understood that the present disclosure contemplates that the described steps may be performed in different sequences than the sequence illustrated, and certain described steps may be skipped and/or not performed altogether. In some embodiments, the process 330 may be implemented by executing instructions stored in a tangible, non-transitory, computer-readable medium within the confidence tool cloud 86 or the confidence tool 4.

The confidence tool cloud 86 scans the entire XML for any URLs that are not video files (block 332). These URLs may be identified as pixels within the XML.

Because each content tag is associated with a vendor tracking pixel, the confidence tool cloud 86 determines whether a content tag has a vendor tracking pixel (block 334). As used herein, a vendor tracking pixel is a pixel that is associated with a particular vendor, as identified by a domain name found in the pixel. By scanning the entire XML for each content tag, the confidence tool cloud 86 may identify a set of URLs associated with pixels. Based on scanning the set of URLs, the confidence tool cloud 86 may identify a particular domain associated with a vendor tracking pixel. After determining a pixel is a vendor tracking pixel by identifying a particular domain associated with the pixel, the confidence tool cloud 86 may determine whether the vendor tracking pixel is certified. If the particular domain of the vendor tracking pixel correlates with a predefined domain from a list of predefined domains associated with certified pixels, then the confidence tool 86 may determine the vendor tracking pixel is indeed certified. Such predefined domains may be stored in a database that is continuously updated as new domains are identified for new vendor tracking pixels that are certified by the confidence tool 86.

In some embodiments, the confidence tool cloud 86 may optionally flag a content tag as a QC fail if the content tag does not include at least one vendor tracking pixel (block 336). Further, in some embodiments, if the content tag includes a vendor tracking pixel, but the vendor tracking pixel is not certified, then the confidence tool 86 may flag the vendor tracking pixel and respective content tag as a QC fail.

In other embodiments, if the content tag includes a vendor tracking pixel, then the confidence tool cloud 86 may compare the vendor of the vendor tracking pixel and the vendor of the content file (e.g., VAST). If the vendor of the vendor tracking pixel and the vendor of the content file (e.g., VAST) are different (block 338), the pixel in the content tag is a fourth party tracking pixel (block 340). Further, when the vendor of the vendor tracking pixel and the vendor of the content file (e.g., VAST) are the same, then the pixel in the content tag is not a fourth party tracking pixel.

In some embodiments, despite identifying a fourth party tracking pixel, the confidence tool cloud 86 may determine the pixel to be a QC pass. In such embodiments, the confidence tool cloud 86 may also flag the pixel as a fourth party tracking pixel in the GUI 160. Thus, an indication of the presence of fourth party tracking pixels may be provided, while not failing quality control.

In some embodiments, the confidence tool cloud 86 may also be integrated with other services that enhance content quality controls by sending a request object to a service and receiving a response. For example, other services may include detection of duplication frames. The confidence tool cloud 86 may determine a QC decision based on the combination of analyzing pixels and other services. The response from other services may be leveraged in the QC decision logic such that an accurate QC decision may be determined and allow evolving business requirements to be considered and upheld.

Content tags (e.g., VAST tags) may contain numerous pixels. The confidence tool cloud 86 may determine whether a pixel (e.g., vendor tracking pixel) is associated with a certified tag domain. As mentioned above, the confidence tool cloud 86 may compare a particular domain of the vendor tracking pixel with a list of predefined domains associated with certified pixels to determine whether the pixel is associated with a certified tag domain. FIG. 15A is a schematic content file 400 that depicts pixel 402 having a domain (e.g., "s.vendor.com") that matches or correlates with a certified tag domain (e.g., domain="s.vendor.com"). If the domain of the pixel correlates with a certified tag domain, then the confidence tool cloud 86 may determine the pixel passes the QC system 112 (e.g., QC pass). In some embodiments, a QC pass may be based on a complete match between the respective domain names of the pixel and the certified content tag.

However, if the domain of the pixel is not certified or does not correlate with a certified tag domain, then the confidence tool cloud 86 may determine the pixel fails the QC system 112 (e.g., QC fail) and/or that the pixel is a fourth party pixel. FIG. 15B is an example schematic content file 430 that depicts a pixel 432 having a different domain (e.g., "dts-.vendor.com") compared to a certified tag domain (e.g., domain="s.vendor.com"). Unlike FIG. 15A, because the domain names of the pixel and the certified content tag do not fully match in FIG. 15B, the pixel fails in the QC system 112. However, in other embodiments, the pixel in FIG. 15B may pass the QC system 112 based on a partial or similar match between the respective domain names of the pixel and the certified content tag. For example, even though a portion of the domain names of the pixel (e.g., "dts") and the certified content tag (e.g., "s") varies, the pixel may pass the QC system 112 since a primary portion of the domain name (e.g., "vendor.com") is the same in respective domain names of the pixel and the certified content tag. Further, in some embodiments, users may be able to specify particular domain name variant rules that are acceptable for certification within a certification rule, resulting in certification of all domain names that meet the variant rules.

In additional and/or alternative embodiments, the QC system 112 may check whether URLs or links within pixels are broken. A broken URL or link associated with a pixel may result in pixel failing the QC system 112. It may be appreciated the quality control checks (e.g., checking for broken URLs associated with pixels) may be performed in different sequences than the sequence illustrated, and certain described steps may be skipped or not performed altogether. Additionally, the quality control checks may be performed by different components than the components illustrated in the confidence tool workflow 60. For example, the confidence tool cloud 86 or the QC system 112 may check for broken URLs associated with a pixel pre-processing or before checking the pixel whitelisting criteria.

With the preceding in mind, FIG. 16 depicts a dashboard view 450 of certification records associated with each pixel with respect to the GUI 160. In this dashboard view 450 of FIG. 16, pixel certification information is displayed. For example, the pixel certification information may include: certification ID 362, vendor name 364, content unit type (e.g., ad type) 366, content tag domain 368, certification stage 370 (e.g., in progress, not certified), certification date 372, system certification 374, system certification date 376, an indication of a user associated with creation of a certification record 378, a date of creation of the certification record 380, a user associated with modifying the certification record 382, additional comments or expectations 384, and so forth. After the confidence tool cloud 86 determines that a pixel is certified, a certification record may be created for the certified pixel. In the dashboard view 450, pixels may be searchable and organized based on column headers (e.g., certification date, vendor name).

Figure 17:
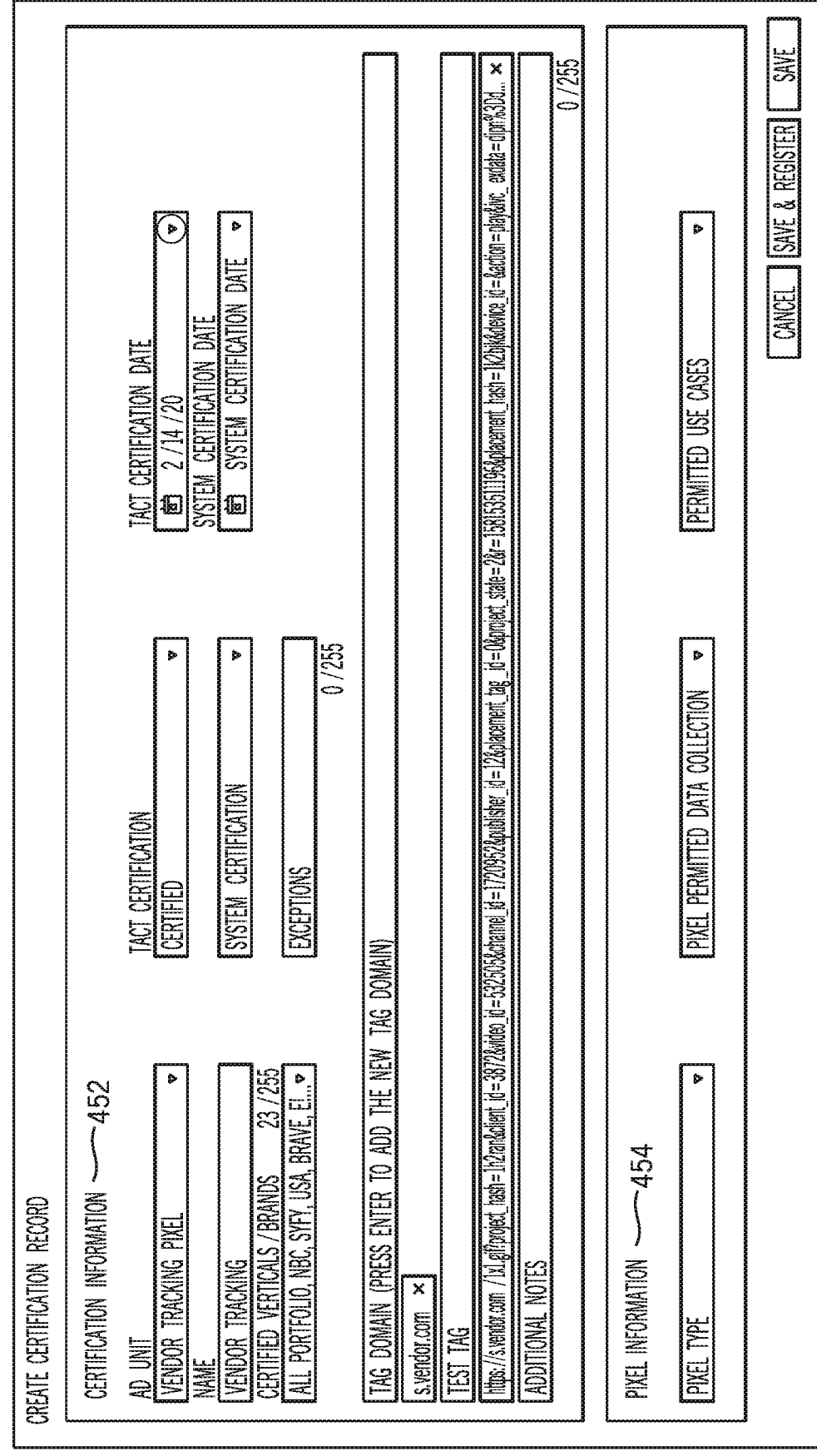
FIG. 17 is a GUI that depicts a certification record for pixels, in accordance with an embodiment of the present disclosure.

FIG. 17 depicts a GUI 450 for generation of a certification record for a pixel. The certification record may include certification information 452 such as content unit or ad unit (e.g., third party tracking pixel), name of pixel, certified vertical(s) associated with the pixel, domain(s), test tag, additional notes, certification stage, certification date, system certification, and so forth as well as pixel information 454. The pixel information may include type of pixel, user access to the pixel, and so forth. As mentioned above, the vertical is associated with the industry (e.g., news, entertainment) in which a vendor offers content. A pixel may be certified for a single vertical or may be certified more than one vertical. If a content tag is submitted under a first vertical, the confidence tool cloud 86 may flag any pixels that are not certified for the first vertical as a QC fail. A test tag includes an example of a domain for a pixel. If a content tag is associated with multiple pixels, it may be useful to include a test tag for each pixel. Additional notes and the pixel information (e.g., additional information related to tracking an intent of a pixel) may not be required fields within the certification record. In particular, the pixel information section may be editable after selecting the content unit as a third party tracking pixel.

The certification stage is used to create the list of certified or recognized pixels as discussed above. The certification stage indicates whether a pixel is certified or in progress for certification. If a pixel has been flagged as certified, the confidence tool cloud 86 has validated the pixel is found within the list of certified or recognized pixels. If a certification record indicates that a pixel is in progress for certification, the confidence tool cloud 86 has not flagged the pixel as certified but may be comparing the pixel to list of certified pixels. Further, the certification stage indicates whether a pixel that was previously certified has become uncertified. In some embodiments, the confidence tool cloud 86 may remove a pixel from the list of certified pixels in response to identifying pixel issues, receiving information from a vendor, content presentation service, and the like that causes the confidence tool cloud 86 the pixel to fail in the QC system 112.

If the pixel has become uncertified, the confidence tool 4 may be notified. The certification date is the date when a pixel became certified. After the various fields of the certification record are completed by a user or auto-populated by the confidence tool cloud 86, the certification record may be saved. In some embodiments, if there is an error (e.g., information entered incorrectly) in the certification record, the certification record may be updated or deleted via an actions tab. In some embodiments, if a pixel becomes uncertified, the certification record associated with the pixel may not be deleted by the user rather the pixel may be flagged as uncertified. In other embodiments, if the pixel becomes uncertified, the user may have the ability of delete the certification record associated with the pixel even though deleting the certification record is not recommended by the QC system 112. Maintaining certification records of previously certified pixels provides allows the confidence tool cloud 86 to determine patterns or trends from the previous records that may be helpful in determining a QC decision for future pixels.

Figure 18:
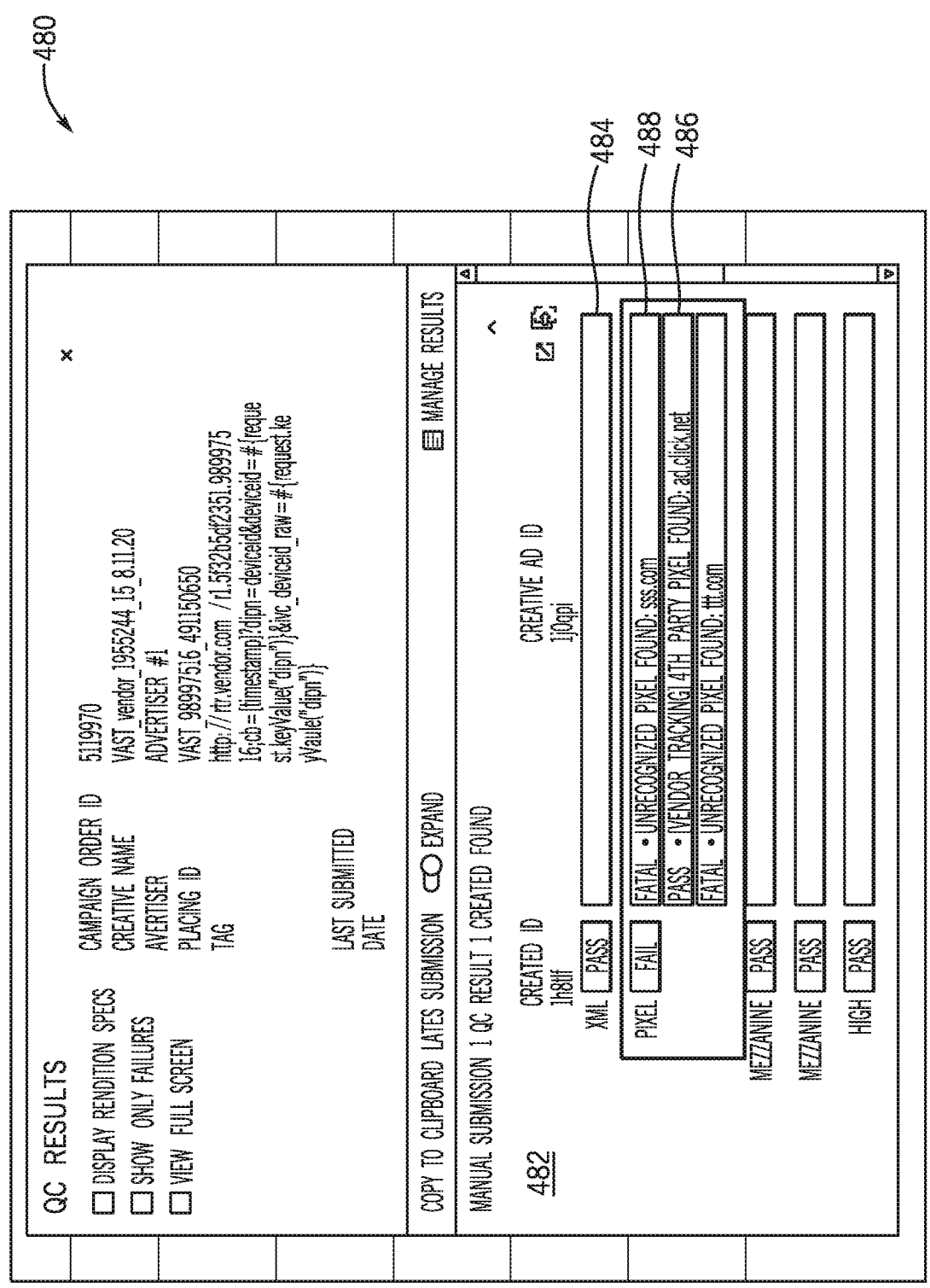
FIG. 18 is a GUI that depicts quality control results based on whether pixels are certified and/or recognized, in accordance with an embodiment of the present disclosure.

FIG. 18 depicts a quality control results GUI 480 that provides quality control results based on whether pixels are certified and/or recognized with respect to the GUI 160. As indicated in FIG. 18, unrecognized or uncertified pixels may be flagged as a QC fail. For example, as indicated in the pixel results 482, an unrecognized pixel 484 was found that uses the domain, sss.com. Further, an unrecognized pixel 486 was found that uses the domain, ttt.com. The QC fail may vary in level of severity for each pixel (e.g., severe fail, fatal fail). A severe fail may include severe pixilation issues that may require manual intervention to resolve the issues. A fatal fail may be associated with problematic pixel issues that cause the confidence tool cloud 86 to block or send a notification to block the content file associated with the pixel.

As mentioned above, fourth party tracking pixels and pixels associated with click through events may be flagged as QC passes, but may be indicated in the quality control results. The fourth party pixel may include a certified domain that wraps in a pixel associated with an uncertified domain. In such a case, the pixel may pass, but an indication of a detected fourth party pixel may be presented, such that users may understand when such pixels are present. By way of example, the pixel results 488 indicate that a fourth party pixel using the domain ad.click.net has been identified. Further, click through events are passed (e.g., QC pass) as well because each click through event has a domain name of the click through destination URL, and it might be difficult to certify every destination URL. However, an indication of pixels associated with click through events may be provided to enable users to understand click through destinations, if desired. In some embodiments, an overall QC decision for the content may be present, a QC decision for each pixel within the content tag, or both.

Returning to FIG. 2, the QC system 112 may submit a test plan (block 116) that includes threshold requirements that may be set by requirements or other criteria of the content provider 12 or an entity commissioning the content. Examples of such requirements include but are not limited to minimum bit rate, aspect ratio, resolution, frame rate, color space, and format specifications. In some embodiments, the threshold requirements are based on third-party servers 10 who sent the content tags or may be set to meet criteria of content presentation services 14. For example, threshold requirements may be set by modeling or simulation techniques based on analyzing a history or record of data collected from the content presentation services 14. The QC system 112 may download renditions of content (block 118) and generate a QC report (block 120) based on the test plan. Downloading renditions of content is an example of a job data type. The job data type may be in a format of a string, number, and/or object. Input fields of the job data type may include unique identifier for the job, type of job, priority of job, time of job creation, and so forth. Status and attributes from the job execution may be outputted based on the job data type. The downloaded renditions of content may be stored in a content bucket 138. As discussed below, the stored files of content may be used for manual QC as indicated by 140.

Content tags that meet quality criteria and threshold requirements set by the content provider 12, may pass the QC process as indicated by 94. As a result, the QC decision 102 may indicate a pass 98 for the content. Content tags that fail to meet quality criteria and threshold requirements set by the content provider, may fail the QC process as indicated by step 96. If the QC report (block 120) includes details that the confidence tool cloud 86 determines a QC fail (step 96) for a content tag, then the QC failed content tag may be checked again via a spot check 100. The spot check 100 includes the spot checking tool 132. The spot checking tool 132 generates a playlist of the failed content (block 134). Based on the playlist, the spot checking tool 132 checks the failed content tags via manual QC (block 136). Manual QC (block 136) is another example that uses a job data type. Again, the confidence tool cloud 86 determines a QC decision as to whether the previously failed content has failed again or passed. If the previously failed content has failed again, then the confident tool cloud 86 sets the QC decision to an overall fail for the previously failed content tag.

After the QC decision is complete, a message indicating a pass or fail is sent to the translator cloud 62. An indication of a QC fail (block 68) or a QC pass (block 70) is displayed via the user interface of the translator cloud 62. In particular, the track workflow status (block 66) is updated in the user interface of the translator cloud 62 as content tags move along the QC process. The track workflow status (block 66) may be associated with the ad summary data type and the QC comments data type. The ad summary data type may be in the format of a string. Further the ad summary data type may specify the order, the content, the rendition, and status of QC results. Furthermore, the QC comments data type may be in the format of a string and/or object. The QC comments data type may specify description of comment, severity of QC warning, system at which comment is created, start time code, end time code, type of QC comment, vendor pixel data, and so forth.

Figure 19:
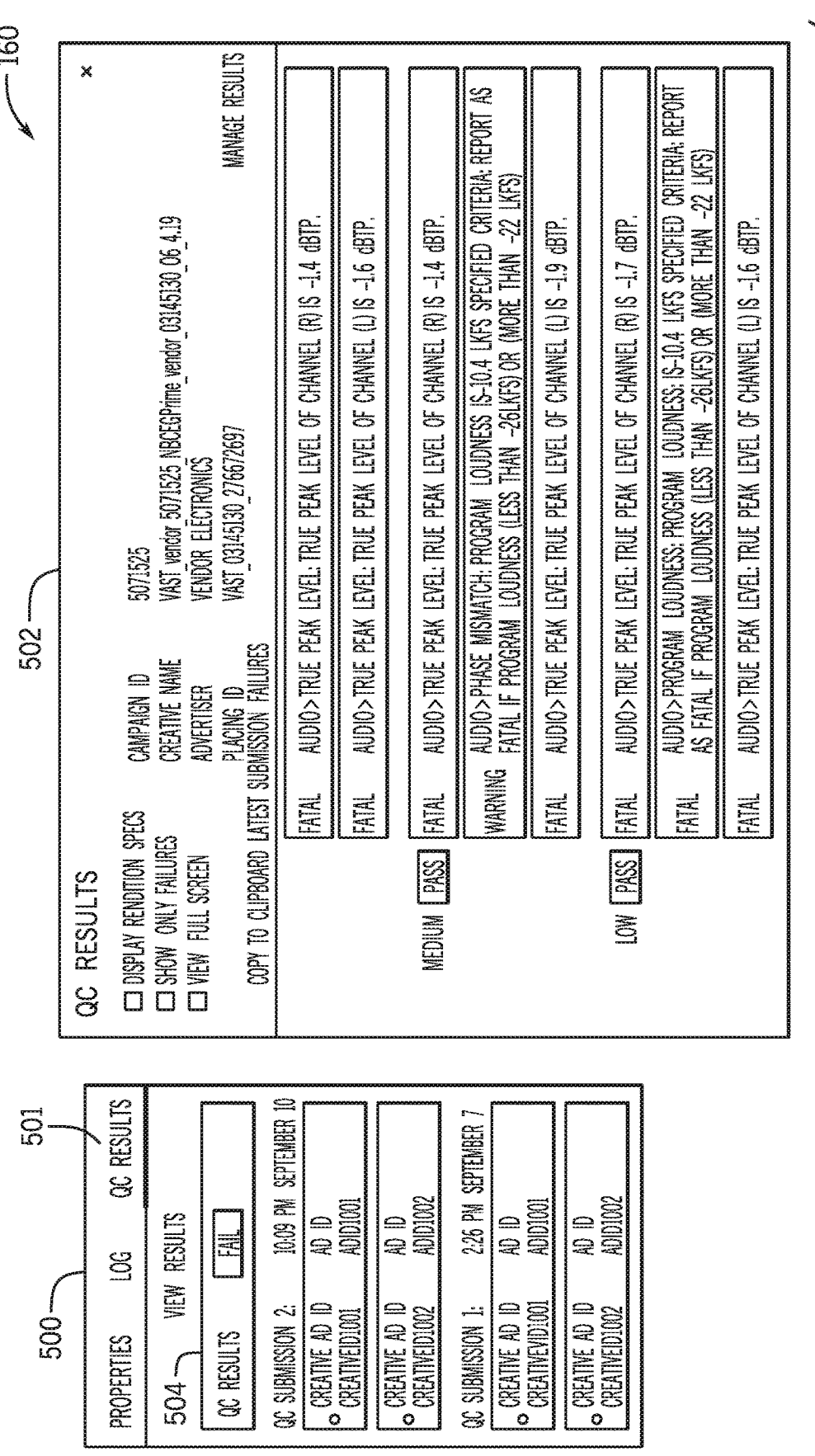
FIG. 19 is a set of GUI elements that depict quality control results based on one or more work orders, in accordance with an embodiment of the present disclosure.

The GUI 160 may depict the track workflow status. In particular, FIG. 19 depicts a QC results view 502. As shown, the work order side panel 500 may have a QC results tab 501, displaying the overall pass of fail of a content tag as well as the pass or fail of particular content associated with the content tag. The QC results for resubmissions for the QC process may be maintained in the tab sorted with the most recent at top. A view results option 504 may lead to a detailed break-down view 502 of the QC results, which includes a VAST XML, check report. This detailed break-down view 502 can also be accessed by selecting the QC results icon results icon in the work panel. Each individual QC result may be marked as fatal, serious, or warning.

Figure 20:
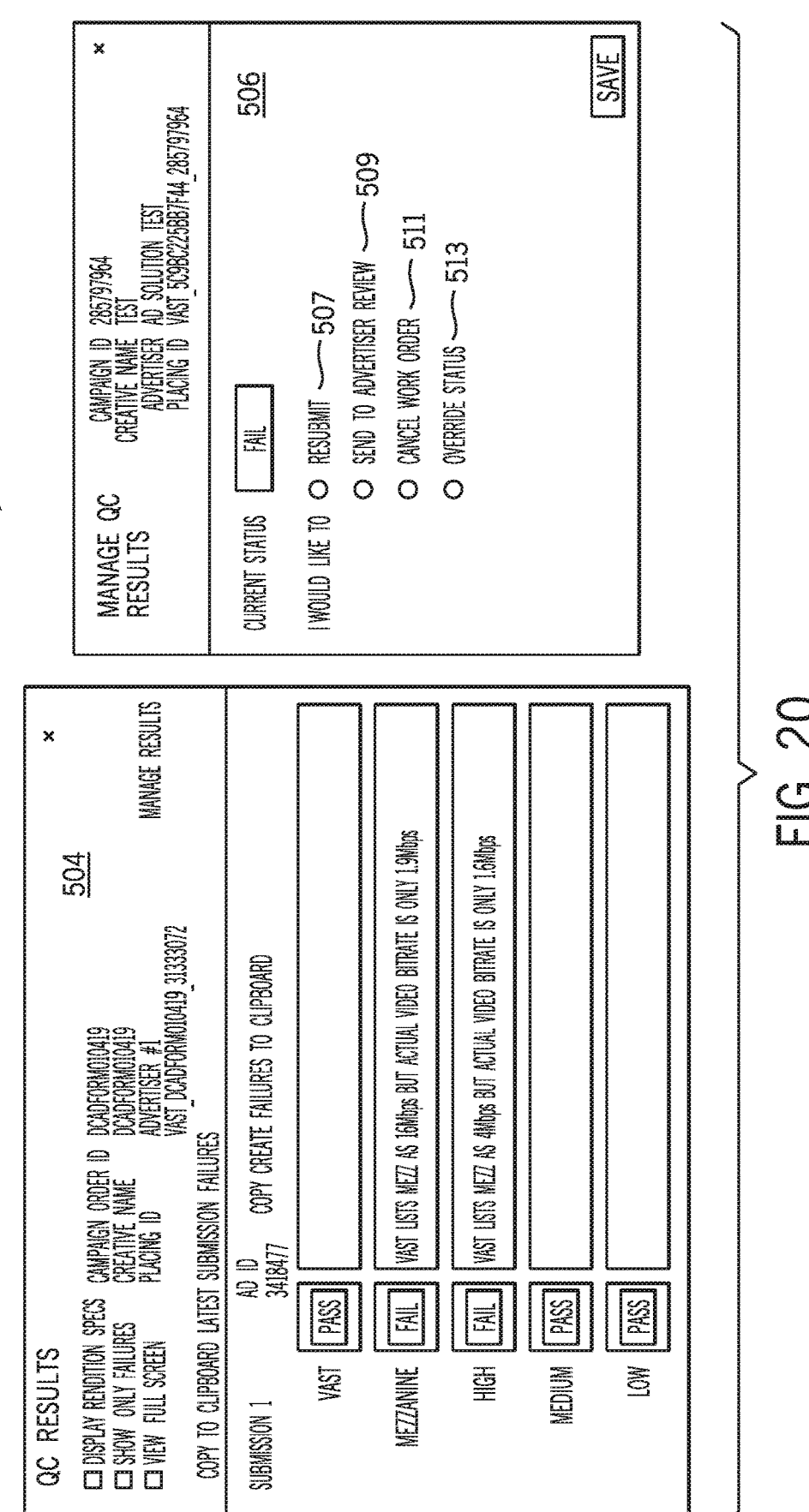
FIG. 20 is a GUI that depicts a detailed view of the quality control results in accordance with an embodiment of the present disclosure.

FIG. 20 depicts a detailed view of the QC results 504 and includes a manage results 506 section of the GUI 160. The manage results section 506 enables users to perform desired actions for orders that did not pass the QC process. Each action enables optional comments to be added by users, which can be captured in the work order history. A resubmit option 507 sends the order back to undergo the quality process again. A send to advertiser review option 509 sends the order back to the advertiser or vendor for fixes and feedback. Further, a cancel work order option 511 removes the work order. An override status 513 changes the QC result from pass to fail or vice versa and completes the order. An override reason may be required to conduct the override status option. In some embodiments, if a content tag passes, it may be marked as live or active. If a content tag fails with either a warning or serious feedback, the content tag may be set live and overridden with a comment of no fatal fail. In this case, feedback may be also sent to an agency or vendor. If a content tag fails with a fatal feedback, it may be shifted to a warning or serious status and feedback may also be sent to an agency or vendor. Additionally, failure results may be copied to clipboard to for easy transfer to email.

Figure 21:
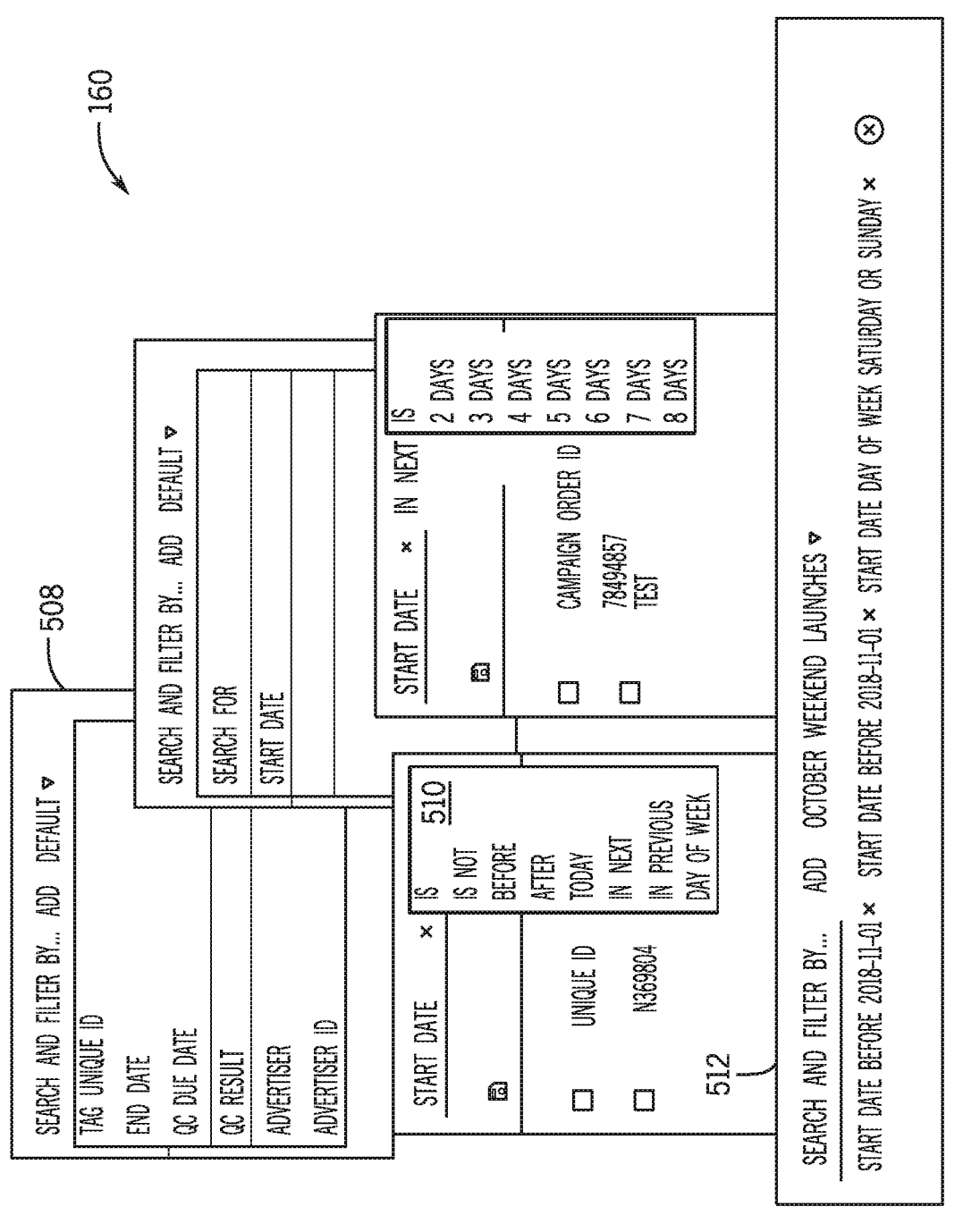
FIG. 21 is a set of GUI elements associated with creating a search, in accordance with an embodiment of the present disclosure.

FIG. 21 depicts GUI 160 portions useful for conducting a search for content tags. A search bar 508 may be clicked to begin conducting searches. After clicking the search bar, a drop down menu 510 may open to choose from search criteria. Search conditions may be chosen, and search parameters may be added. Further, multiple parameters may be added to narrow down search results 512. For example, as illustrated, parameters that identify the content tag such content name may be used to find search results for campaign information, tag information related to the content tag.

Figure 22:
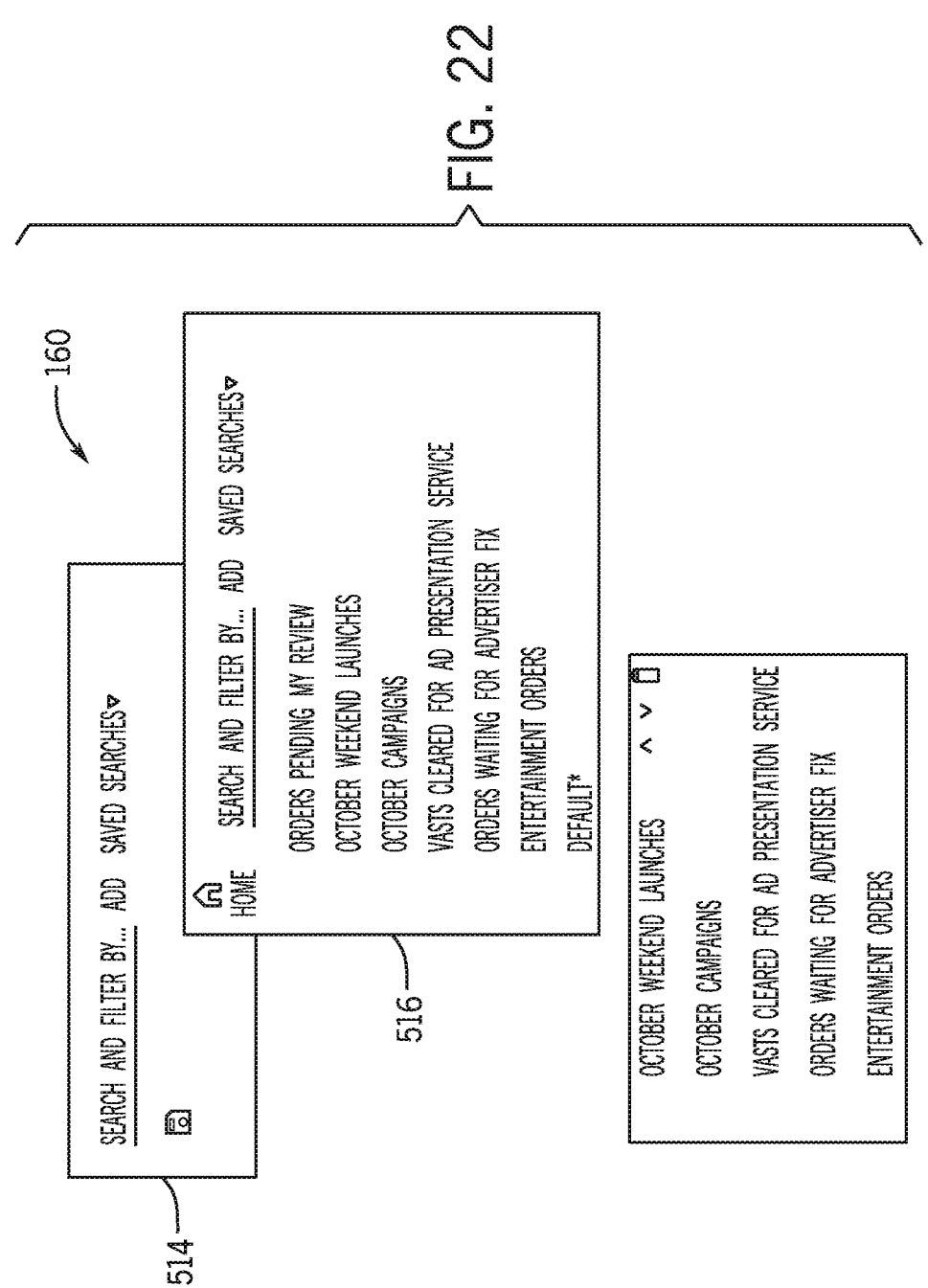
FIG. 22 is a set of GUI elements associated with creating a saved search, in accordance with an embodiment of the present disclosure.

FIG. 22 depicts GUI 160 portions useful for creating a saved search. A save icon 514 may be clicked after populating a search query, which results in the search query being saved. Saved searches 516 may be found in a dropdown menu near the search bar. Hovering over on the far left of a saved search and choosing it to become default creates a default search filter. Hovering over on the far right of a saved search removes the saved search or rearranges the saved search order. Selecting a saved search populates the search bar with the search query criteria previously associated with the saved search.

Figure 23:
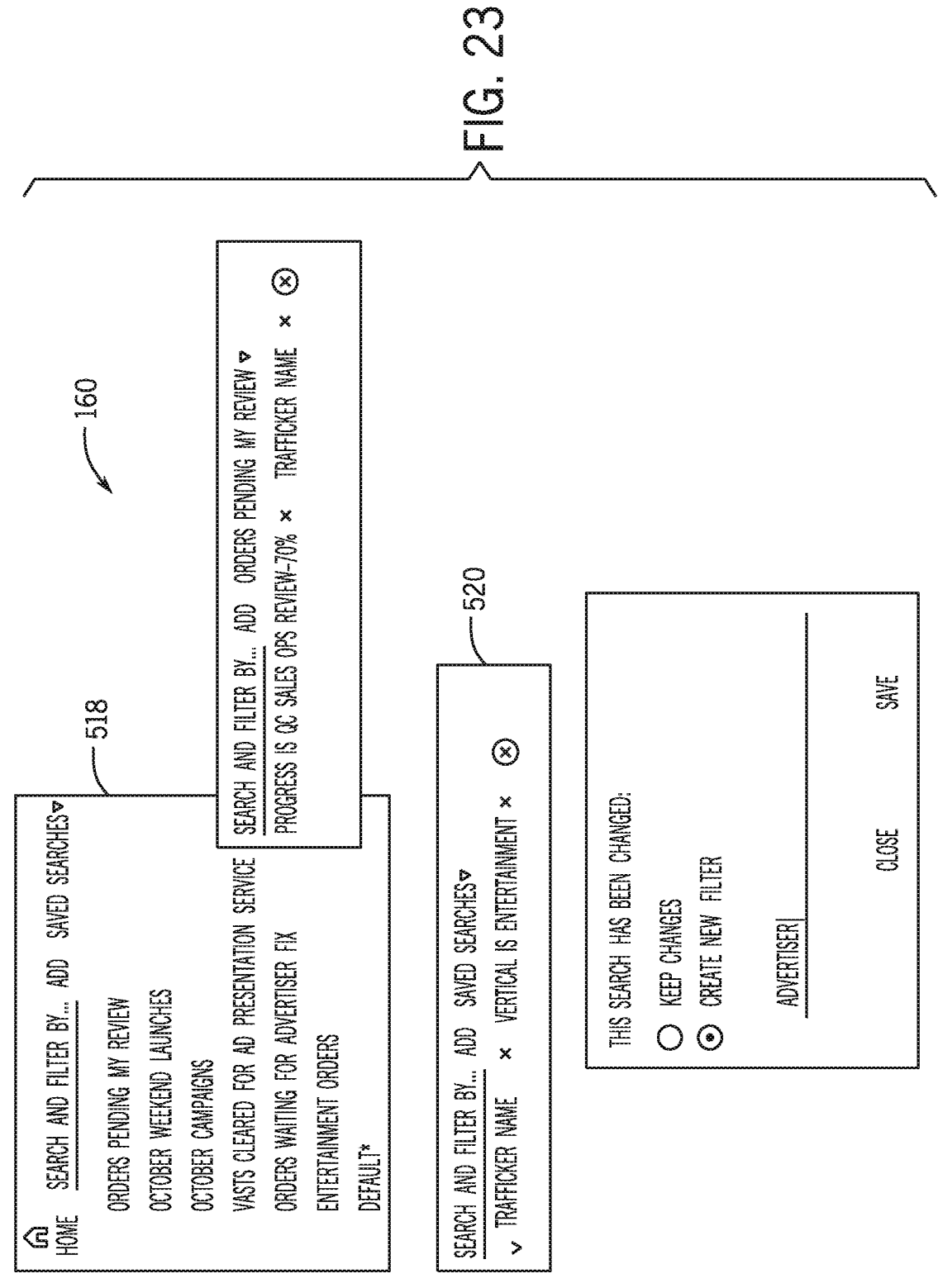
FIG. 23 is a set of GUI elements associated with editing a saved search, in accordance with an embodiment of the present disclosure.

FIG. 23 depicts GUI 160 portions for editing a saved search. To edit a saved search, a saved search is selected from the saved search dropdown, as indicated by 518. Parameters are added or removed as desired before clicking the save icon. Further, as indicated by 520, editing an existing search may be saved as the same search or may be created as a new one.

Figure 24:
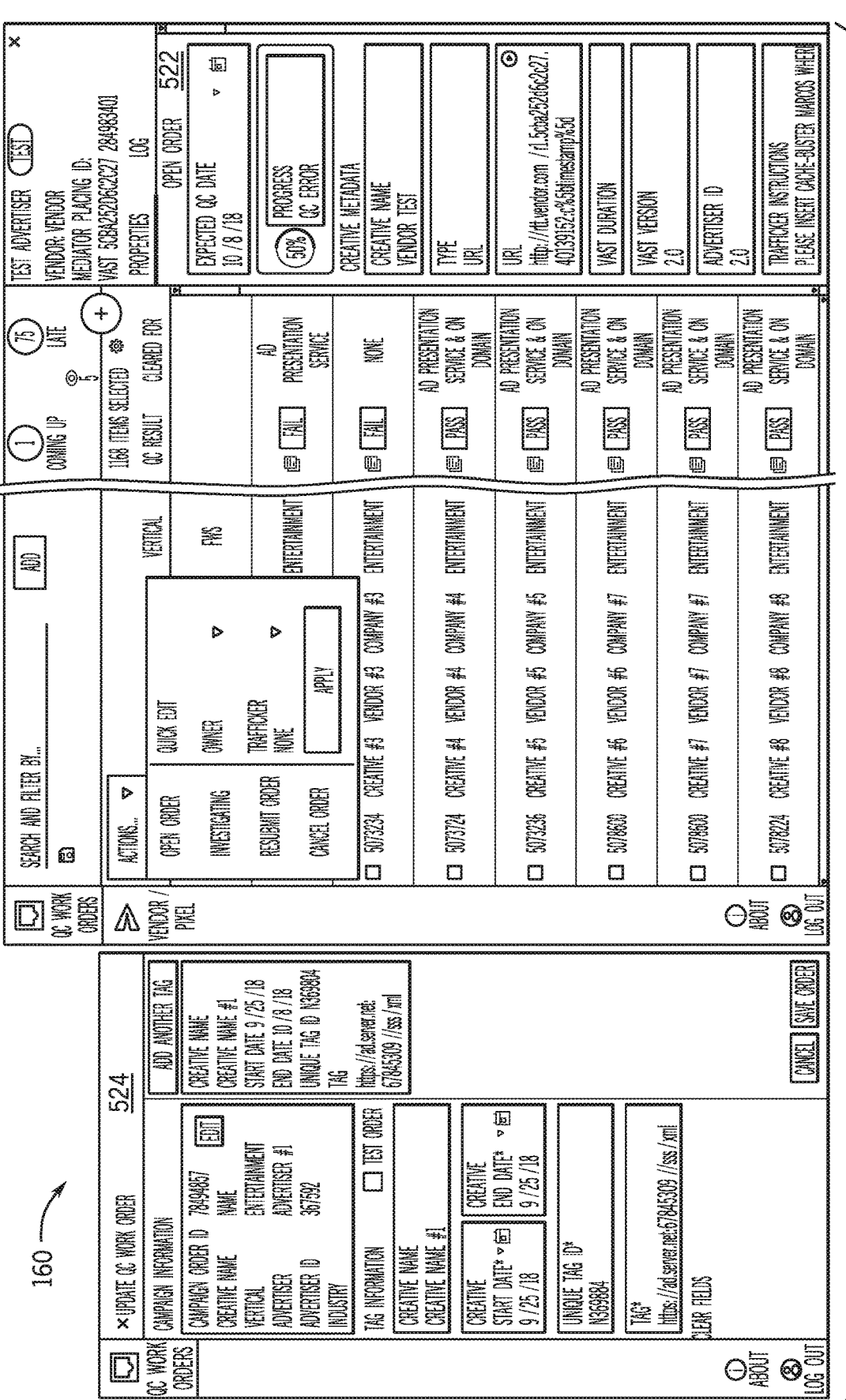
FIG. 24 is a set of GUIs associated with editing the work order, in accordance with an embodiment of the present disclosure.

FIG. 24 depicts GUI 160 portions for editing an existing work order 522. Selecting the edit button in the work order panel directs back to the campaign information 524 from FIG. 5 to be edited. Clicking save applies any edits and directs back to the work order panel.

Returning back to FIG. 2, after an indication of a QC fail (block 68) or a QC pass (block 70) is displayed via the user interface of the translator cloud 62, the content tag may be delivered or canceled in the translator cloud 62. If there is an indication of a QC fail, the order (e.g., content tag) may be resubmitted to undergo the QC process again (block 72), referred to an advertiser, which puts the order on hold until a decision is made (block 74), may be overridden to a QC pass, or may be canceled (block 78). In some embodiments, if the QC fail decision is overridden, the content tag may be delivered (block 80). The track delivery status 76 provides a status of the delivery of the content tag after it has been indicated as a QC pass. A QC pass or QC fail is determined based on comparing attributes of the content tag with quality criteria or testing parameters as discussed below. Before the content tag is delivered (block 80), it undergoes a delivery process 104 in the confidence tool cloud 86. A content provider server 142, also referred to as an ad server 144, may add the content tag to its content library (block 146). The content provider server 142 may be an API (content provider server API 144). If the confidence tool cloud 86 delivery is successful, then the content provider server 142 automatically generates a unique ID (block 148) that is sent back to the confidence tool cloud 86 via the content provider server API 144. As a result, the placing status is changed to "delivered" (block 81) in the confidence tool cloud 86. This delivered placing status (block 82) is sent to the translator cloud 62, which then displays the delivered status via the user interface.

As mentioned above, even after content that is deemed to have passed a quality control inspection, third-party servers (e.g., third party advertisers, third party vendors) may modify or add to a content file (e.g., VAST). A content file may contain one or multiple contents and may include information about the content regarding bit rate, pixel size, duration, resolution, and so forth. Each content file may be associated with a content tag (e.g., VAST tag). Therefore, active (e.g., live) and in-flight (e.g., scheduled to be live) content tags that are eligible may be pulsed (block 108) for any changes via the confidence tool 4 or the confidence tool cloud 86. The confidence tool cloud 86 performs pulsing to programmatically determine any changes made to the received content tags from third-party servers. Pulsing may be performed on a continuous or periodic basis (every 1 second, every 1 hour, once a day, twice a day or any suitable time period). After the confidence tool 4 communicates with the content provider server API 144 to confirm eligibility (e.g., active, in-flight) of the content tag, the confidence tool 4 may scan a content library for any changes to the content tag (block 150). If changes to the content tag are identified, the confidence tool 4 submits the content tag to the confidence tool workflow 60 again to be checked or monitored for quality. Based on determining whether various attributes of the content tag abides by certain quality criteria (e.g., criteria of the content provider server 142 and/or an entity commissioning the creation/editing of the content), the confidence tool cloud 86 makes a decision 110 to continue pulsing or deactivate the content tag. When attributes of the content tag do not meet quality criteria, the confidence tool cloud 86 may provide an indication to the deactivator component 2, triggering deactivation of the content tags that do not meet the quality criteria. In some embodiments, if the content tag passes the QC system 112 after being resubmitted, the work order may remain as is and may be pulsed again at a set time schedule.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A tangible, non-transitory, machine-readable medium, comprising machine-readable instructions that, when executed by one or more processors of a machine, cause the machine to:

receive a processor-interpretable request to analyze a tag indicating content to be presented via a content presentation service of a plurality of content presentation services, wherein the tag comprises a link to the content and wherein the content presentation service comprises an Internet streaming service remote from the machine;

in response to the processor-interpretable request, perform automated quality control, by:

identifying criteria specific to the content presentation service that is required to be met by the content for playback of the content via the content presentation service, wherein the criteria comprises content formatting parameters that the content should adhere to, as defined by the Internet streaming service remote from the machine;

identifying whether the tag is active or inflight;

in response to identifying that the tag is active or inflight, performing a third-party change check, by iteratively determining, at periodic intervals, whether the content indicated by the tag meets the criteria;

providing, via a graphical user interface (GUI), a dynamically updated user notification indicating whether the content indicated by the tag meets the criteria specific to the content presentation service at the periodic intervals; and in response to identifying that the tag is not active or inflight, refraining from iteratively determining whether the content indicated by the tag meets the criteria.

2. The tangible, non-transitory, machine-readable medium of claim 1, wherein the user notification comprises a pass indication when the content indicated by the tag meets the criteria and a fail indication when the content indicated by the tag does not meet the criteria.

3. The tangible, non-transitory, machine-readable medium of claim 1, comprising machine-readable instructions, that when executed by the one or more processors, cause the machine to:

determine whether content indicated by a plurality of tags meet the criteria; and provide, via the GUI, a report comprising an indication corresponding to each of the plurality of tags, indicating whether the criteria is met by a content indicated by a corresponding tag.

4. The tangible, non-transitory, machine-readable medium of claim 1, comprising machine-readable instructions, that when executed by the one or more processors, cause the machine to:

collect a history of playback data from the content presentation service;

identify problematic content based upon a ratio breaching a threshold value indicating the problematic content, wherein the ratio comprises: an expected playback amount of the problematic content found in the history of playback data to the amount of actual playback of the problematic content found in the history of playback data; and determine the content formatting parameters that the content should adhere to by comparing formatting of the problematic content with formatting of non-problematic content having a corresponding ratio that does not breach the threshold.

5. The tangible, non-transitory, machine-readable medium of claim 1, wherein the content formatting parameters comprise a minimum bit rate that the content should adhere to, as defined by the Internet streaming service remote from the machine.

6. The tangible, non-transitory, machine-readable medium of claim 1, wherein the content formatting parameters comprise a particular aspect ratio that the content should adhere to, as defined by the Internet streaming service remote from the machine.

7. The tangible, non-transitory, machine-readable medium of claim 1, wherein the content formatting parameters comprise a particular resolution that the content should adhere to, as defined by the Internet streaming service remote from the machine.

8. The tangible, non-transitory, machine-readable medium of claim 1, wherein the content formatting parameters comprise a particular frame rate that the content should adhere to, as defined by the Internet streaming service remote from the machine.

9. The tangible, non-transitory, machine-readable medium of claim 1, wherein the content formatting parameters comprise a particular color space that the content should adhere to, as defined by the Internet streaming service remote from the machine.

10. The tangible, non-transitory, machine-readable medium of claim 1, wherein the content formatting parameters comprise a frame duplication criteria that the content should adhere to, as defined by the Internet streaming service remote from the machine.

11. The tangible, non-transitory, machine-readable medium of claim 1, comprising machine-readable instructions, that when executed by the one or more processors, cause the machine to determine whether the content indicated by the tag meets the criteria, by analyzing at least an amount of actual playback via the content presentation service, as indicated in received historical data.

12. The tangible, non-transitory, machine-readable medium of claim 1, comprising machine-readable instructions, that when executed by the one or more processors, cause the machine to:

in response to the content indicated by the tag meeting the criteria:

provide the tag to a content provider to schedule the content for presentation;

pulse the tag to determine whether subsequent changes associated with the tag occur; and when subsequent changes associated with the tag occur that do not meet the criteria, provide a first deactivation command to cause the content provider to refrain from further scheduling of the tag; and in response to the content indicated by the tag not meeting the criteria:

provide a second deactivation command to cause the content provider to refrain from scheduling of the tag.

13. A method, comprising:

receiving, via a processor, a processor-interpretable request to analyze a tag indicating content to be presented via a content presentation service of a plurality of content presentation services, wherein the tag comprises a link to the content and wherein the content presentation service comprises an Internet streaming service remote from the processor;

in response to receiving the processor-interpretable request, performing automated quality control, by:

identifying, via the processor, criteria specific to the content presentation service that is required to be met by the content for playback of the content via the content presentation service, wherein the criteria comprises content formatting parameters that the content should adhere to, as defined by the Internet streaming service remote from the processor;

identifying at a first time that the tag is active or inflight;

in response to identifying that the tag is active or inflight, performing a third-party change check, by iteratively determining, at periodic intervals, via the processor, whether the content indicated by the tag meets the criteria;

providing, via the processor, at a graphical user interface (GUI), a dynamically updated user notification indicating whether the content indicated by the tag meets the criteria specific to the content presentation service at the periodic intervals;

identifying at a second time that the tag is not active or inflight; and in response to identifying that the tag is not active or inflight, refraining from iteratively determining whether the content indicated by the tag meets the criteria.

14. The method of claim 13, wherein the content indicated by the tag comprises a video ad serving template (VAST) tag.

15. The method of claim 13, comprising:

determining whether the content indicated by the tag meets the criteria, by:

sending a request to a service to provide an analysis of the content;

receiving the analysis of the content from the service; and determining whether the analysis of the content indicates that the content indicated by the tag meets the criteria.

16. The method of claim 13, wherein the criteria comprises a frame duplication criteria that the content should adhere to, as defined by the content presentation service.

17. The method of claim 13, wherein the criteria comprises an audio spike criteria that the content should adhere to, as defined by the content presentation service.

18. The method of claim 13, wherein the criteria comprises a pixilation criteria that the content should adhere to, as defined by the content presentation service.

19. The method of claim 18, comprising:

determining whether the content indicated by the tag meets the criteria, by determining whether a uniform resource locator (URL) of the tag is broken.

20. A confidence tool, comprising:

a memory; and one or more processors, configured to:

receive a processor-interpretable request to analyze a tag indicating content to be presented at a content presentation service of a plurality of content presentation services, wherein the tag comprises a link to the content and wherein the content presentation service comprises an Internet streaming service remote from the one or more processors;

in response to receiving the processor-interpretable request, perform automated quality control, by:

identifying criteria specific to the content presentation service that is required to be met by the content for playback of the content via the content presentation service, wherein the criteria comprises content formatting parameters that the content should adhere to, as defined by the Internet streaming service remote from the one or more processors;

identifying whether the tag is active or inflight;

in response to identifying that the tag is active or inflight, performing a third-party change check, by iteratively determining, at periodic intervals, whether the content indicated by the tag meets the criteria;

providing, via a graphical user interface (GUI), a dynamically updated user notification indicating whether the content indicated by the tag meets the criteria specific to the content presentation service at the periodic intervals; and in response to identifying that the tag is not active or inflight, refraining from iteratively determining whether the content indicated by the tag meets the criteria.

* * * * *